US012573900B2

(12) United States Patent
Nakayama et al.

(10) Patent No.: US 12,573,900 B2
(45) Date of Patent: Mar. 10, 2026

(54) ROTOR AND ROTATING ELECTRIC MACHINE

(71) Applicant: DENSO CORPORATION, Kariya-city (JP)

(72) Inventors: Takahiro Nakayama, Kariya-city (JP); Ritsuro Hiramatsu, Kariya-city (JP); Toshihiro Uchida, Kariya-city (JP); Masahito Sakai, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 260 days.

(21) Appl. No.: 18/201,471

(22) Filed: May 24, 2023

(65) Prior Publication Data

US 2023/0299628 A1    Sep. 21, 2023

Related U.S. Application Data

(63) Continuation of application No. PCT/JP2021/043258, filed on Nov. 25, 2021.

(30) Foreign Application Priority Data

Nov. 26, 2020    (JP) ................................. 2020-196160
Jun. 4, 2021     (JP) ................................. 2021-094750

(51) Int. Cl.
*H02K 1/276* (2022.01)
*H02K 21/16* (2006.01)

(52) U.S. Cl.
CPC ........... *H02K 1/2773* (2013.01); *H02K 21/16* (2013.01)

(58) Field of Classification Search
CPC ....... H02K 1/277; H02K 1/2773; H02K 21/16
(Continued)

(56) References Cited

U.S. PATENT DOCUMENTS

| 7,385,328 B2 * | 6/2008 | Melfi | ..................... H02K 29/03 |
| | | | 310/156.53 |
| 2003/0201685 A1 * | 10/2003 | Shimada | ................ H02K 15/03 |
| | | | 310/156.53 |

(Continued)

FOREIGN PATENT DOCUMENTS

| JP | 2005287285 A | * 10/2005 |
| JP | 2012-23804 A | 2/2012 |

(Continued)

OTHER PUBLICATIONS

English Translation of JP2015065764A (Year: 2015).*
English Translation of JP 2005287285 A (Year: 2005).*

*Primary Examiner* — Terrance L Kenerly
*Assistant Examiner* — Theodore L Perkins
(74) *Attorney, Agent, or Firm* — Oliff PLC

(57) ABSTRACT

A rotor includes: a rotor core including a plurality of core sheets that are laminated together and having a plurality of magnet-receiving holes formed in a folded shape; and a plurality of permanent magnets embedded respectively in the magnet-receiving holes. Each of the core sheets has a plurality of first through-holes and a plurality of second through-holes. Each of the first through-holes has a connection portion formed at an intermediate position in the folded shape of a corresponding one of the magnet-receiving holes to connect inner peripheral edges of the first through-hole that face each other in a width direction of the first through-hole. Each of the second through-holes has no connection portion. The core sheets are identical in configuration to each other. The core sheets are laminated so that each of the magnet-receiving holes is constituted of a mixture of the first and second through-holes of the core sheets.

12 Claims, 14 Drawing Sheets

(58) Field of Classification Search
USPC ..................................................... 310/156.56
See application file for complete search history.

(56) References Cited

U.S. PATENT DOCUMENTS

2015/0303751 A1* 10/2015 Ekin ........................ H02K 1/28
                                                        310/43
2015/0318743 A1* 11/2015 Baba .................... H02K 1/2766
                                                        310/156.38

FOREIGN PATENT DOCUMENTS

| JP | 2013-90386 A | | 5/2013 |
|----|----|----|----|
| JP | 2013-121253 A | | 6/2013 |
| JP | 2015065764 A | * | 4/2015 |
| JP | 2015-220950 A | | 12/2015 |
| JP | 2016-152653 A | | 8/2016 |
| JP | 2017-118797 A | | 6/2017 |
| JP | 2018-085779 A | | 5/2018 |
| WO | 2020/017262 A1 | | 1/2020 |

* cited by examiner

1ST POSITION

2ND POSITION
(ROTATED BY 45°)

1ST POSITION

2ND POSITION
(ROTATED BY 45°)

FIG.15

ROTOR AND ROTATING ELECTRIC MACHINE

CROSS-REFERENCE TO RELATED APPLICATIONS

The present application is a continuation application of International Application No. PCT/JP2021/043258 filed on Nov. 25, 2021, which is based on and claims priority from Japanese Patent Application No. 2020-196160 filed on Nov. 26, 2020 and Japanese Patent Application No. 2021-094750 filed on Jun. 4, 2021. The entire contents of these applications are incorporated by reference into the present application.

BACKGROUND

1 Technical Field

The present disclosure relates to interior permanent magnet rotors and rotating electric machines.

2 Description of Related Art

Rotating electric machines have been well known which employ Interior Permanent Magnet (IPM) rotors. The IPM rotors have permanent magnets embedded in a rotor core. The IPM rotors are configured to generate both magnet torque by the permanent magnets and reluctance torque by outer core portions located radially outside the permanent magnets.

In such IPM rotors, configuring the permanent magnets to have a folded shape (e.g., a V-shape or a U-shape) that is convex radially inward in an axial view (see, for example, JP2018085779A), it is possible to enlarge the outer core portions and the surfaces of the permanent magnets which abut the outer core portions. That is, an increase in the torque of the rotating electric machine can be expected.

SUMMARY

Since magnet-receiving holes are formed in the rotor core to receive the permanent magnets, it is difficult to set the positions and shapes of connection portions of the rotor core which connect the outer core portions with a main body portion of the rotor core. Specifically, the connection portions are also portions where magnetic flux leakage occurs. Therefore, it is preferable to set the widths of the connection portions to be small. On the other hand, if the widths of the connection portions are set to be small, the connection portions that support the outer core portions become structurally weak, resulting in a decrease in the strength of the outer core portions against the centrifugal force. The more the outer core portions are enlarged to increase the torque, the more remarkable this problem becomes.

The inventors of the present application have investigated whether such a problem can be solved by a simple countermeasure. The present disclosure has been accomplished based on the results of the investigation by the inventors of the present application.

According to a first aspect of the present disclosure, a rotor is provided. The rotor includes: a rotor core including a plurality of core sheets that are laminated together and having a plurality of magnet-receiving holes formed in a folded shape that is convex radially inward; and a plurality of permanent magnets embedded respectively in the magnet-receiving holes of the rotor core. Each of the plurality of core sheets has a plurality of first through-holes and a plurality of second through-holes. Each of the first through-holes has a connection portion formed at an intermediate position in the folded shape of a corresponding one of the magnet-receiving holes to connect inner peripheral edges of the first through-hole that face each other in a width direction of the first through-hole. Each of the second through-holes has no connection portion. The plurality of core sheets are identical in configuration to each other. The plurality of core sheets are laminated so that each of the magnet-receiving holes of the rotor core is constituted of a mixture of the first and second through-holes of the plurality of core sheets. Each of the plurality of permanent magnets is a bonded magnet.

According to a second aspect of the present disclosure, a rotating electric machine is provided which includes a rotor and a stator. The rotor includes: a rotor core including a plurality of core sheets that are laminated together and having a plurality of magnet-receiving holes formed in a folded shape that is convex radially inward; and a plurality of permanent magnets embedded respectively in the magnet-receiving holes of the rotor core. The stator is configured to apply a rotating magnetic field to the rotor. Each of the plurality of core sheets has a plurality of first through-holes and a plurality of second through-holes. Each of the first through-holes has a connection portion formed at an intermediate position in the folded shape of a corresponding one of the magnet-receiving holes to connect inner peripheral edges of the first through-hole that face each other in a width direction of the first through-hole. Each of the second through-holes has no connection portion. The plurality of core sheets are identical in configuration to each other. The plurality of core sheets are laminated so that each of the magnet-receiving holes of the rotor core is constituted of a mixture of the first and second through-holes of the plurality of core sheets. Each of the plurality of permanent magnets is a bonded magnet.

In the above rotor and rotating electric machine according to the present disclosure, the first through-holes each having the connection portion formed at the intermediate position in the folded shape of the corresponding magnet-receiving hole and the second through-holes each having no connection portion coexist in each of the core sheets. Moreover, the core sheets, which are identical in configuration to each other, are laminated so that each of the magnet-receiving holes of the rotor core is constituted of a mixture of the first and second through-holes of the core sheets. Consequently, each of outer core portions of the rotor core, which are located radially outside the permanent magnets, is supported with respect to a common portion of the rotor core at three locations, i.e., two locations where two connection portions are respectively formed outside the radially outer ends of the corresponding magnet-receiving hole and the location where the connection portions of the first through-holes are formed. That is, each of the outer core portions is supported at the newly-added connection portions of the first through-holes as well as at the two connection portions that are provided inevitably due to the configuration of the corresponding magnet-receiving hole in the IPM rotor. As a result, the strength of the outer core portions against the centrifugal force is improved. In addition, it becomes possible to realize the rotor and the rotating electric machine according to the present disclosure by the simple countermeasure of preparing only one type of the core sheets.

BRIEF DESCRIPTION OF THE DRAWINGS

FIG. 15 is a plan view of a rotor according to another modification.

DESCRIPTION OF EMBODIMENTS

Hereinafter, an embodiment of a rotor and a rotating electric machine will be described. It should be noted that the expression "at least one of A and B" in the present disclosure should be understood as meaning "only A, only B, or both A and B".

Figure 1:
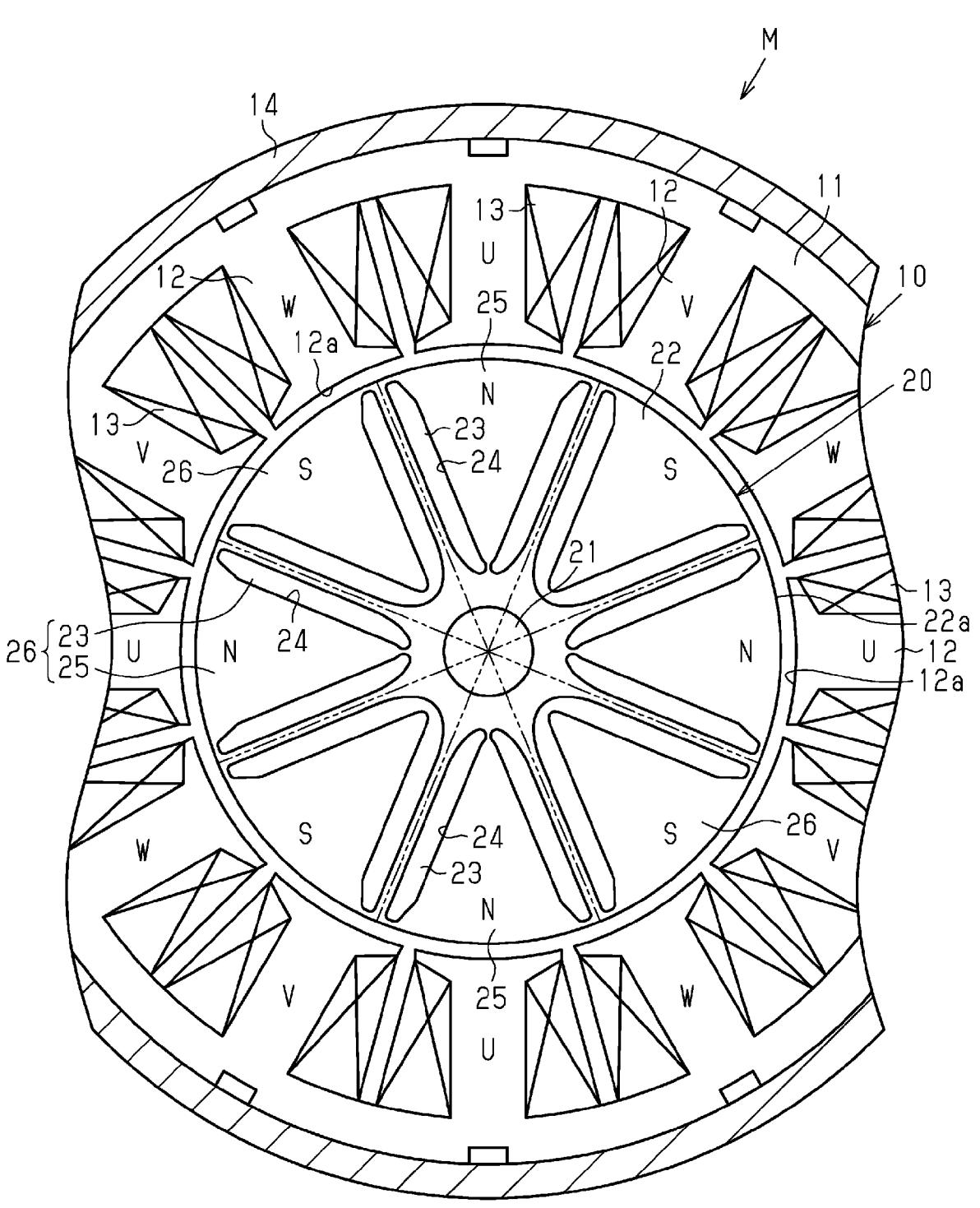
FIG. 1 is a configuration diagram of a rotating electric machine which includes an IPM rotor according to an embodiment.

As shown in FIG. 1, a rotating electric machine M according to the present embodiment is configured as an IPM brushless motor. The rotating electric machine M includes a substantially annular stator 10 and a substantially cylindrical rotor 20 that is rotatably arranged in a space radially inside the stator 10.

The stator 10 includes a substantially annular stator core 11. The stator core 11 is formed of a magnetic metal material. For example, the stator core 11 may be formed by laminating a plurality of magnetic steel sheets. The stator core 11 has a plurality (more particularly, twelve in the present embodiment) of teeth 12 extending radially inward and arranged at equal intervals in a circumferential direction. All the teeth 12 are identical in shape to each other. Each of the teeth 12 has a substantially T-shaped radially inner end portion (i.e., distal end portion) and a distal end surface 12a formed in an arc shape along an outer circumferential surface of the rotor 20. Windings 13 are wound around the twelve teeth 12 in a concentrated winding manner. That is, in the present embodiment, the number of magnetic poles of the stator 10 is set to 12. The windings 13 are connected in three phases to respectively function as a U-phase, a V-phase and a W-phase as shown in FIG. 1. Upon supply of electric power to the windings 13, the stator 10 generates a rotating magnetic field, thereby driving the rotor 20 to rotate. In addition, in the stator 10, an outer circumferential surface of the stator core 11 is fixed to an inner circumferential surface of a housing 14.

The rotor 20 includes a rotating shaft 21, a substantially cylindrical rotor core 22 having the rotating shaft 21 inserted in a central part thereof, and a plurality (more particularly, eight in the present embodiment) of permanent magnets 23 embedded in the rotor core 22. That is, in the present embodiment, the number of magnetic poles of the rotor 20 is set to 8. The rotor 20 is rotatably arranged with respect to the stator 10, with the rotating shaft 21 supported by bearings (not shown) provided in the housing 14.

Figure 2:
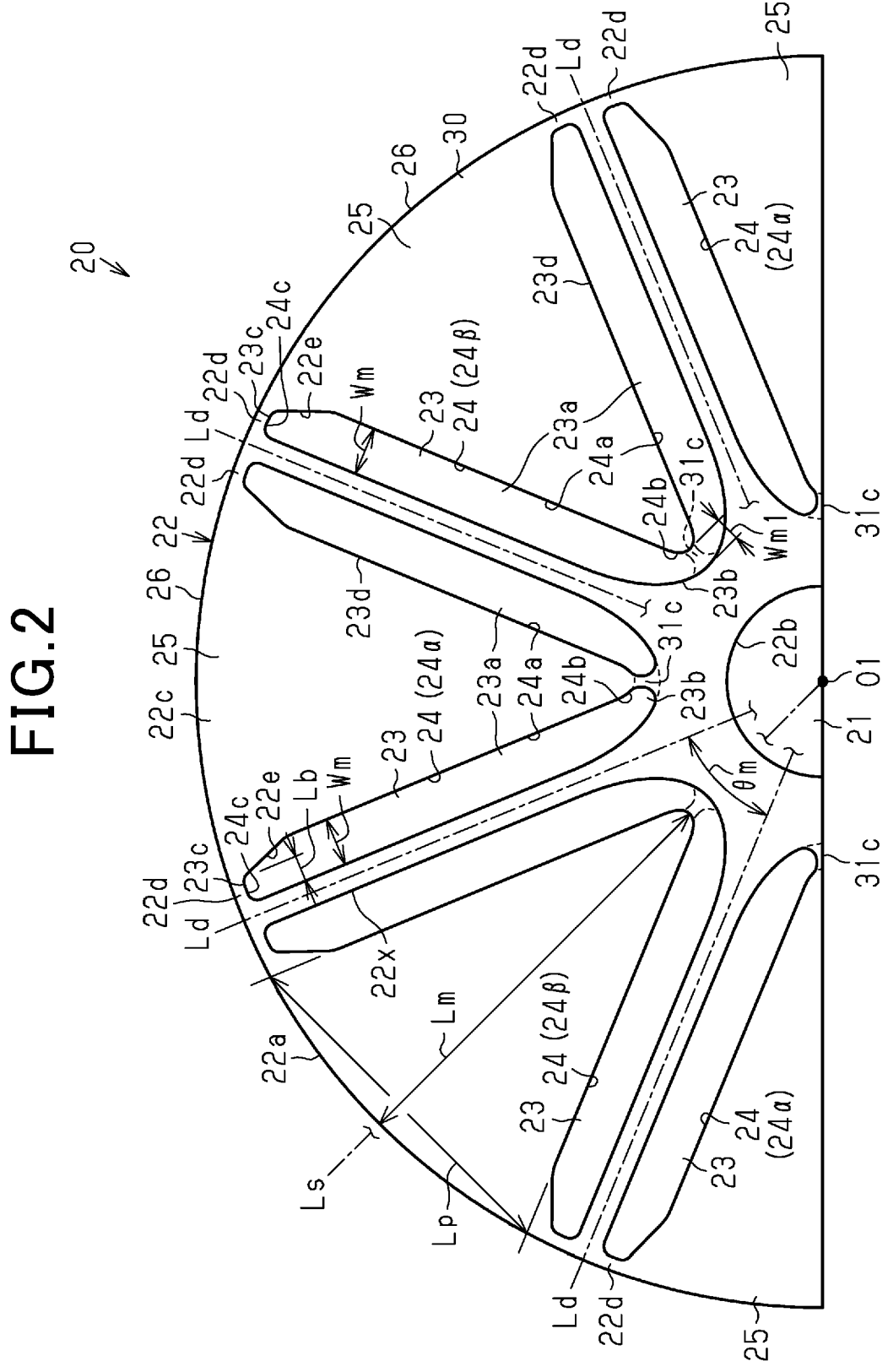
FIG. 2 is a plan view of the rotor shown in FIG. 1.

As shown in FIG. 2, the rotor core 22 has a plurality of magnet-receiving holes 24 for receiving the permanent magnets 23 therein. More particularly, in the present embodiment, eight magnet-receiving holes 24 are formed at equal intervals in the circumferential direction of the rotor core 22. Each of the magnet-receiving holes 24 has a folded substantially V-shape that is convex radially inward. More specifically, each of the magnet-receiving holes 24 has a shape such that the radially inner ends of a pair of straight portions 24a are connected by a curved portion 24b. Moreover, for each of the magnet-receiving holes 24, the radially outer ends 24c of the pair of straight portions 24a of the magnet-receiving hole 24 are located near the outer circumferential surface 22a of the rotor core 22; and the curved portion 24b of the magnet-receiving hole 24 is located near a shaft insertion hole 22b which is formed in the central part of the rotor core 22 and in which the rotating shaft 21 is inserted.

For each of the magnet-receiving holes 24, the width of the pair of straight portions 24a (corresponding to the thickness Wm of straight portions 23a of the permanent magnets 23) is set to be constant; and the width of the curved portion 24b (corresponding to the thickness Wm1 of curved portions 23b of the permanent magnets 23) is set so as to gradually become smaller than the width of the pair of straight portions 24a. Moreover, each of the magnet-receiving holes 24 is formed to extend over the entire axial length of the rotor core 22. In the present embodiment, the magnet-receiving holes 24 include two types of magnet-receiving holes, i.e., first-type magnet-receiving holes 24a and second-type magnet-receiving holes 24ß that have substantially the same configuration, but are slightly different from each other (the details thereof will be described later).

Figure 3:
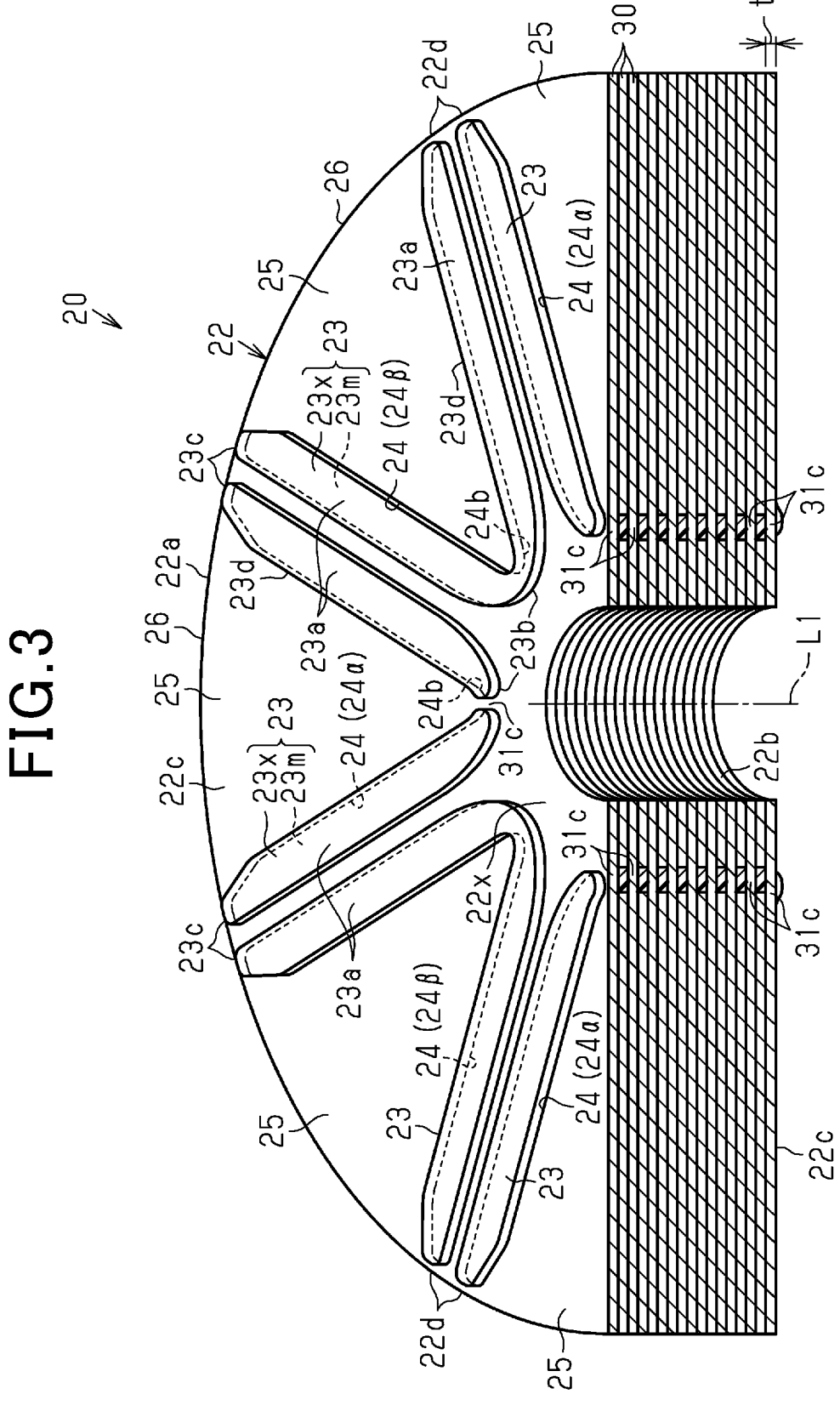
FIG. 3 is a perspective view of the rotor shown in FIG. 1.
Figures 4A, 4B:
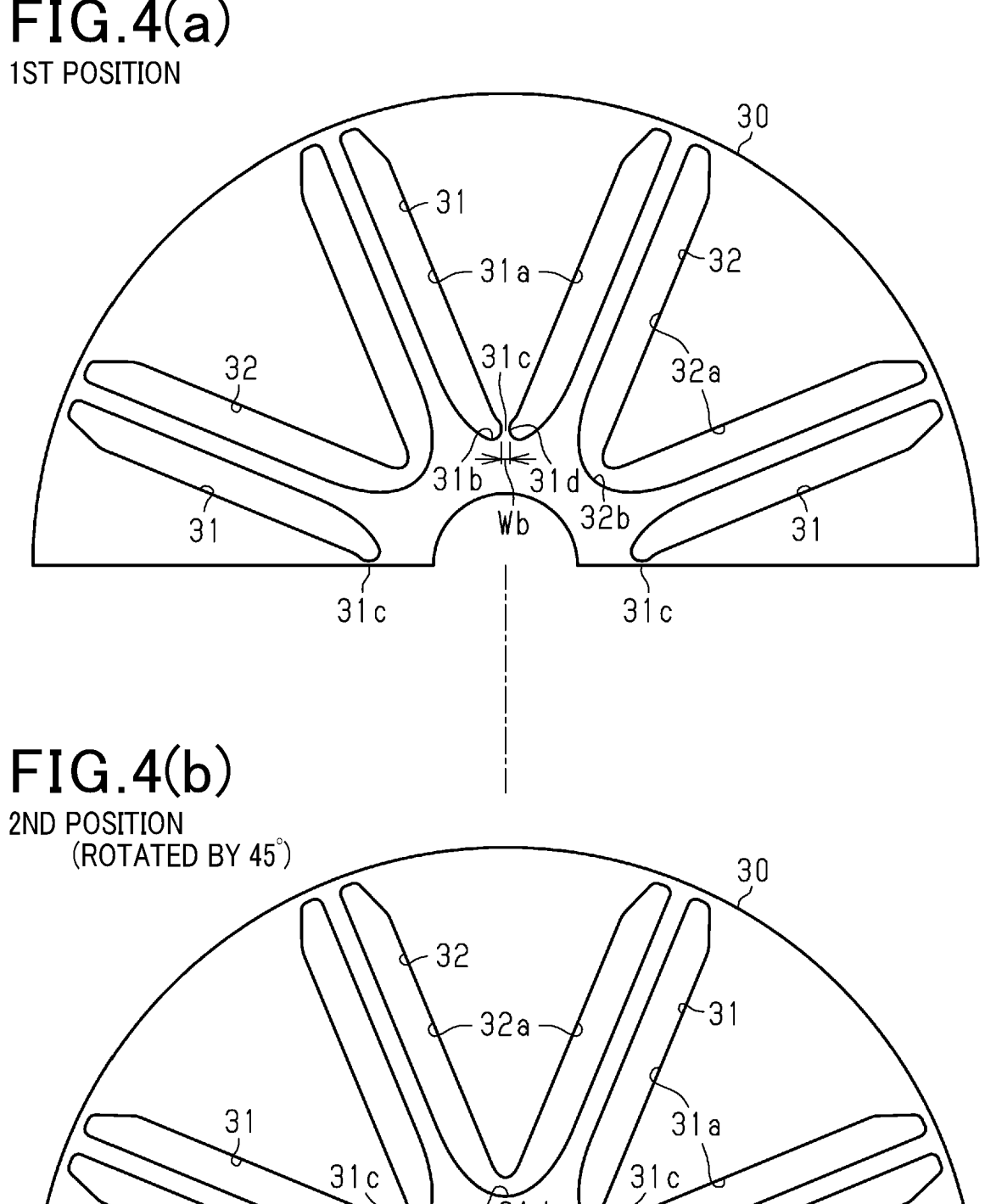
FIGS. 4(*a*) and 4(*b*) are plan views of a core sheet employed in the rotor shown in FIG. 1.

As shown in FIG. 3, the rotor core 22 is formed by laminating a plurality of core sheets 30 in the direction of an axis L1; the core sheets 30 are made of magnetic steel sheets. In the present embodiment, all the core sheets 30 employed in the rotor core 22 have the same configuration as shown in FIG. 4(*a*). In addition, the core sheet 30 shown in FIG. 4(*b*) appears at first glance to be different in shape from the core sheet 30 shown in FIG. 4(*a*). However, FIGS. 4(*a*) and 4(*b*) actually show the same core sheet 30 arranged at two different positions, i.e., at a first position in FIG. 4(*a*) and at a second position in FIG. 4(*b*); the second position is rotated with respect to the first position by an angle corresponding to one magnet-receiving hole 24, i.e., by 45° corresponding to one magnetic pole of the rotor 20. In each of the core sheets 30, two types of through-holes 31 and 32 are formed in a mixed manner so as to constitute the two types of magnet-receiving holes 24 of the rotor core 22.

Each of the first and second through-holes 31 and 32 has a folded substantially V-shape that is convex radially inward. More specifically, each of the first and second through-holes 31 and 32, has a shape such that the radially inner ends of a pair of straight portions 31a or 32a are connected by a curved portion 31*b* or 32*b*. As a difference between the first through-holes 31 and the second through-holes 32, the curved portion 31*b* of each of the first through-holes 31 has a connection portion 31*c* whereas the curved portion 32*b* of each of the second through-holes 32 does not have a connection portion such as the connection portion 31*c*. In each of the first through-holes 31, the connection portion 31*c* extends in a width direction of the first through-hole 31 to connect inner peripheral edges of the first through-hole 31 with each other; the inner peripheral edges face each other in the width direction of the first through-hole 31. In the present embodiment, the connection portion 31*c* has a width Wb set to be smaller than or equal to the thickness t (see FIG. 3) of each of the core sheets 30. Moreover, side edges 31*d* of the connection portion 31*c* have a uniformly curved shape such that the width of the connection portion 31*c* decreases toward a central part in the extending direction of the connection portion 31*c*. For example, the curved shape of the side edges 31*d* may be set to have a radius of curvature substantially half the length of the connection portion 31*c* in the extending direction thereof. In each of the core sheets 30, the first through-holes 31 and the second through-holes 32 are arranged alternately at intervals of 45° in the circumferential direction.

In the present embodiment, in the process of laminating the core sheets 30 to form the rotor core 22, the core sheets 30 are laminated so that those core sheets 30 which are arranged at the first position shown in FIG. 4(*a*) and those core sheets 30 which are arranged at the 45°-rotated second position shown in FIG. 4(*b*) alternate in units of one core sheet. Consequently, as shown in FIG. 2, in the resultant rotor core 22, there are formed both the first-type magnet-receiving holes 24α and the second-type magnet-receiving holes 24β. In each of the first-type magnet-receiving holes 24α, the first through-holes 31 each having the connection portion 31*c* formed at the curved portion 31*b* thereof are arranged, from the upper side to the lower side, alternately with the second through-holes 32 each having no connection portion formed at the curved portion 32*b* thereof. On the other hand, in each of the second-type magnet-receiving holes 24β, the second through-holes 32 each having no connection portion formed at the curved portion 32*b* thereof are arranged, from the upper side to the lower side, alternately with the first through-holes 31 each having the connection portion 31*c* formed at the curved portion 31*b* thereof. That is, the order of arranging the first and second through-holes 31 and 32 in the first-type magnet-receiving holes 24α is opposite to that in the second-type magnet-receiving holes 24β.

Moreover, in the resultant rotor core 22, there are also formed outer core portions 25 that are located on the inner side of the folded substantially V-shape of the permanent magnets 23 received in the magnet-receiving holes 24 and radially outside the permanent magnets 23. Each of the outer core portions 25 is supported with respect to a common portion 22*x* of the rotor core 22 at three locations, i.e., two locations where two connection portions 22*d* are respectively formed outside the radially outer ends 24*c* of the pair of straight portions 24*a* of a corresponding one of the magnet-receiving holes 24 and a location where the connection portions 31*c* of the first through-holes 31 are formed in every other core sheet 30. Consequently, each of the outer core portions 25 is supported at the newly-added connection portions 31*c* that are located at the curved portion 24*b* of the corresponding magnet-receiving hole 24 as well as at the two connection portions 22*d* that are provided inevitably due to the configuration of the corresponding magnet-receiving hole 24. As a result, the strength of the outer core portions 25 against the centrifugal force is improved.

As above, for each of the outer core portions 25, there are provided the connection portions 22*d* and 31*c* at the three locations; and the connection portions 22*d* and 31*c* are arranged in a well-balanced manner around the outer core portion 25. Such an arrangement contributes to the stable support of the outer core portions 25. Moreover, setting the widths of the connection portions 22*d* and 31*c* to be smaller than or equal to the thickness t of each of the core sheets 30, magnetic flux leakage, which is a concern, can be sufficiently reduced. Furthermore, at the radially outer ends 24*c* of the magnet-receiving holes 24, corner portions on the inner side of the folded substantially V-shape of the magnet-receiving holes 24 protrude in a tapered shape to form protruding portions 22*e*. Consequently, the width of the radially outer ends 24*c* of the magnet-receiving holes 24 is reduced; thus, the length Lb of the connection portions 22*d* on the radially outer side of the radially outer ends 24*c* becomes smaller than the width of the straight portions 24*a* of the magnet-receiving holes 24 (corresponding to the thickness Wm of the straight portions 23*a* of the permanent magnets 23). As a result, it becomes possible to further improve the strength of the outer core portions 25 against the centrifugal force.

In addition, as shown in FIG. 3, in the present embodiment, the number of the core sheets 30 forming the rotor core 22 is set to an odd number. In this case, each of the magnet-receiving holes 24 has the same opening shape on both the axial end faces 22*c* of the rotor core 22 respectively on the upper and lower sides. Alternatively, the number of the core sheets 30 forming the rotor core 22 may be set to an even number. In this case, for each of the magnet-receiving holes 24, the opening shapes of the magnet-receiving hole 24 on the axial end faces 22*c* of the rotor core 22 are respectively the opening shape of the first through-holes 31 and the opening shape of the second through-holes 32. In the magnet-receiving holes 24 configured as above, there are respectively embedded the permanent magnets 23.

In the present embodiment, the permanent magnets 23 are implemented by bonded magnets that are formed by molding and solidifying a magnet material; the magnet material is a mixture of a magnet powder and a resin. More specifically, in the present embodiment, the magnet-receiving holes 24 of the rotor core 22 serve as forming molds. The permanent magnets 23 are formed by: filling the magnet material, which has not been solidified, into the magnet-receiving holes 24 of the rotor core 22 by injection molding without any gaps remaining therein; and then solidifying the magnet material in the magnet-receiving holes 24. Consequently, the external shape of the permanent magnets 23 conforms to the shape of the magnet-receiving holes 24 of the rotor core 22. Moreover, in the present embodiment, in each of the magnet-receiving holes 24, the magnet material also enters the gaps between the connection portions 31*c* that are formed in every other core sheet 30. In addition, in the present embodiment, a samarium-iron-nitrogen-based (i.e., SmFeN-based) magnet powder is employed as the magnet powder for forming the permanent magnets 23. It should be noted that other rare-earth magnet powders may alternatively be employed as the magnet powder for forming the permanent magnets 23.

As shown in FIG. 2, each of the permanent magnets 23 has a folded substantially V-shape that is convex radially inward in an axial view. More specifically, each of the permanent magnets 23 has a shape such that the radially inner ends of a pair of straight portions 23*a* are connected by a curved portion 23b. The radially outer ends 23c of the pair of straight portions 23a are located near the outer circumferential surface 22a of the rotor core 22. Moreover, for each of the permanent magnets 23, the thickness Wm of the pair of straight portions 23a is set to be constant; and the thickness Wm1 of the curved portion 23b is set so as to gradually become smaller than the thickness Wm of the pair of straight portions 23a. Since the permanent magnets 23 are formed directly in the magnet-receiving holes 24, the permanent magnets 23 have a shape corresponding to the magnet-receiving holes 24. Each of the permanent magnets 23 has an axisymmetric shape with respect to a circumferential centerline Ls thereof passing through an axis center O1 of the rotor 20. Furthermore, the permanent magnets 23 are located in close proximity to magnetic-pole boundary lines Ld each extending between an adjacent pair of the permanent magnets 23 and through the axis center O1 of the rotor 20. The angle between each adjacent pair of the magnetic-pole boundary lines Ld, i.e., the magnetic-pole opening angle θm of each rotor magnetic pole 26 including one of the permanent magnets 23 is 180° in electrical angle.

For each of the substantially V-shaped permanent magnets 23, the distance between the intersection points between extension lines of inside surfaces of the straight portions 23a of the permanent magnet 23 and the outer circumferential surface 22a of the rotor core 22 is defined as a magnetic pole pitch Lp; and the distance on the circumferential centerline Ls of the permanent magnet 23 from the outer circumferential surface 22a of the rotor core 22 to an inside surface of the curved portion 23b of the permanent magnet 23 is defined as an embedding depth Lm. In the present embodiment, each of the permanent magnets 23 is formed to have a deep folded shape such that the embedding depth Lm is larger than the magnetic pole pitch Lp and thus the curved portion 23b thereof is located near the central part of the rotor core 22. That is, in the present embodiment, for each of the substantially V-shaped permanent magnets 23, the magnet surface 23d of the permanent magnet 23, which is constituted of the inside surfaces of the straight portions 23a and curved portion 23b of the permanent magnet 23, is set to be larger than the magnet surface of a well-known surface permanent magnet rotor (not shown). It should be noted that: the above-described folded shape is merely an example of the shape of the permanent magnets 23; and the permanent magnets 23 may be suitably modified to have other shapes, such as a folded substantially V-shape with a small embedding depth Lm or a folded substantially U-shape with a large curved portion 23b.

As shown in FIG. 3, each of the permanent magnets 23 is provided over the entire axial length of the rotor core 22. Moreover, each of the permanent magnets 23 is formed to partially protrude from both the axial end faces 22c of the rotor core 22. More specifically, each of the permanent magnets 23 has an embedded magnet portion 23m located in a corresponding one of the magnet-receiving holes 24 of the rotor core 22 and a pair of protruding portions 23x that protrude respectively from the axial end faces 22c of the rotor core 22. The protruding portions 23x of the permanent magnets 23 can be easily realized by providing, in forming molds (not shown) for closing the magnet-receiving holes 24 that open to the axial end faces 22c of the rotor core 22, recesses for forming the protruding portions 23x. In addition, in each of the permanent magnets 23, the protruding portions 23x are formed continuously and integrally with the embedded magnet portion 23m that is located in the corresponding magnet-receiving hole 24 of the rotor core 22.

The permanent magnets 23, which are provided mainly in the magnet-receiving holes 24 of the rotor core 22, are magnetized, after solidification of the magnet material, by a magnetizing apparatus (not shown) located outside the rotor core 22, so as to function as genuine permanent magnets. More specifically, each of the permanent magnets 23 is magnetized in its thickness direction. In the present embodiment, as shown in FIG. 1, eight permanent magnets 23 are arranged in the circumferential direction of the rotor core 22 and magnetized so that the polarities of the permanent magnets 23 are alternately different in the circumferential direction.

Those portions of the rotor core 22 which are located on the inner side of the folded substantially V-shape of the permanent magnets 23 and radially outside the permanent magnets 23 function as the outer core portions 25 facing the stator 10 to generate reluctance torque. When viewed along the axial direction, each of the outer core portions 25 has a substantially triangular shape with one vertex oriented toward the central part of the rotor 20. In the present embodiment, the rotor 20 has eight rotor magnetic poles 26 each including a corresponding one of the eight permanent magnets 23 and a corresponding one of the outer core portions 25 which is surrounded by the corresponding substantially V-shaped permanent magnet 23. As shown in FIG. 1, the rotor magnetic poles 26 function as N poles and S poles alternately in the circumferential direction. The rotor 20 having the rotor magnetic poles 26 as described above can properly generate both magnet torque and reluctance torque.

Next, operation of the rotor 20 of the rotating electric machine M according to the present embodiment will be described. In the present embodiment, the rotor core 22 of the rotor 20 is formed by laminating the core sheets 30; in each of the core sheets 30, as shown FIGS. 4(a) and 4(b), the first through-holes 31 each having the connection portion 31c and the second through-holes 32 each having no connection portion coexist alternately in the circumferential direction. In this case, the core sheets 30 of a single type are prepared. Then, as shown in FIG. 3, a predetermined number of the core sheets 30 are laminated so that those core sheets 30 which are arranged at the first position and those core sheets 30 which are arranged at the 45°-rotated second position alternate one by one. Thereafter, the permanent magnets 23 are formed directly in the individual magnet-receiving holes 24, more specifically, in the first-type and second-type magnet-receiving holes 24a and 24ß that have substantially the same configuration and differ only in the order of the first and second through-holes 31 and 32. Then, the permanent magnets 23 are magnetized to form the rotor 20.

In the rotor core 22, as shown in FIGS. 2 and 3, each of the outer core portions 25, which are located radially outside the corresponding permanent magnets 23, is supported by the common portion 22x of the rotor core 22 at the three locations, i.e., the two locations where the two connection portions 22d are respectively formed outside the radially outer ends 24c of the corresponding magnet-receiving hole 24 and the location where the connection portions 31c are formed, in every other core sheet 30, at the curved portion 24b of the corresponding magnet-receiving hole 24 on the radially inner side. That is, in the present embodiment, each of the outer core portions 25 of the rotor core 22 is supported at the newly-added connection portions 31c as well as at the two connection portions 22d that are provided inevitably due to the configuration of the corresponding magnet-receiving hole 24. As a result, the strength of the outer core portions 25 against the centrifugal force is improved.

Figure 5:
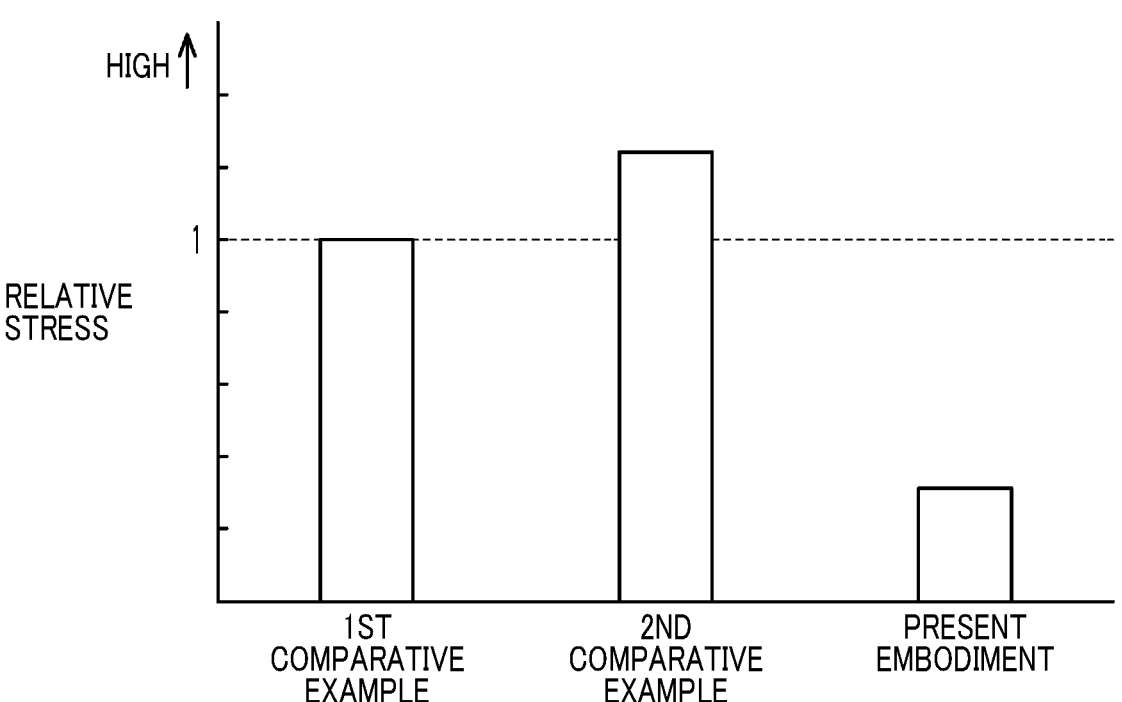
FIG. 5 is an explanatory diagram for explaining the characteristics of the rotor shown in FIG. 1.

FIG. 5 shows the results of a comparison made between the present embodiment, a first comparative example and a second comparative example for evaluation of the strength of the outer core portions 25 against the centrifugal force. In the first comparative example, each of the permanent magnets 23 is formed to have a shallow folded shape such that the embedding depth Lm (see FIG. 2) is about half the radius of the rotor core 22. In the second comparative example, each of the permanent magnets 23 is formed to have a deep folded shape such that the curved portion 23b thereof is located near the central part of the rotor core 22, as in the present embodiment. However, in the second comparative example, each of the magnet-receiving holes 24 has no connection portions 31c formed at the curved portion 24b thereof. Moreover, in the second comparative example, there are no protruding portions 23x (see FIG. 3) provided in the permanent magnets 23 and no protruding portions 22e (see FIG. 2) provided in the magnet-receiving holes 24. The comparison is made between the present embodiment and the first and second comparative examples in terms of the stress acting on the two connection portions 22d supporting each outer core portion 25; and the stress is shown in a relative value that is 1 in the first comparative example. In the second comparative example, since the permanent magnets 23 have the deep folded shape and both the magnet surfaces 23d of the permanent magnets 23 and the outer core portions 25 are accordingly enlarged, an increase in the torque can be expected as compared with the first comparative example. However, in the second comparative example, the weight of the outer core portions 25 is increased as compared with the first comparative example and thus the relative stress (i.e., the relative value of the stress acting on the connection portions 22d) becomes higher than 1. That is to say, in the second comparative example, the strength of the outer core portions 25 against the centrifugal force is lowered as compared with the first comparative example.

In contrast, in the present embodiment, since each of the outer core portions 25 is supported at the three locations, i.e., at the newly-added connection portions 31c as well as at the two connection portions 22d, the relative stress (i.e., the relative value of the stress acting on the connection portions 22d) becomes sufficiently lower than 1. That is to say, in the present embodiment, the strength of the outer core portions 25 against the centrifugal force is improved as compared with both the first and second comparative examples.

In addition, the same improvement in the strength of the outer core portions 25 against the centrifugal force as described above may be achieved alternately by: preparing two types of core sheets 30, i.e., core sheets 30 in which only first through-holes 31 each having a connection portion 31c are formed and core sheets 30 in which only second through-holes 32 each having no connection portion are formed; and laminating the core sheets 30 of the two types alternately. However, in this case, it is necessary to prepare two types of core sheets 30; thus the manufacture and management of the core sheets 30 may become complicated.

In contrast, in the present embodiment, in each of the core sheets 30, the first through-holes 31 each having the connection portion 31c and the second through-holes 32 each having no connection portion coexist alternately in the circumferential direction; and the core sheets 30 are laminated so that each of the magnet-receiving holes 24 is constituted of a mixture of the first and second through-holes 31 and 32 of the core sheets 30. That is, in the present embodiment, the improvement in the strength of the outer core portions 25 against the centrifugal force is achieved by the simple countermeasure of preparing only one type of the core sheets 30.

Figure 6:
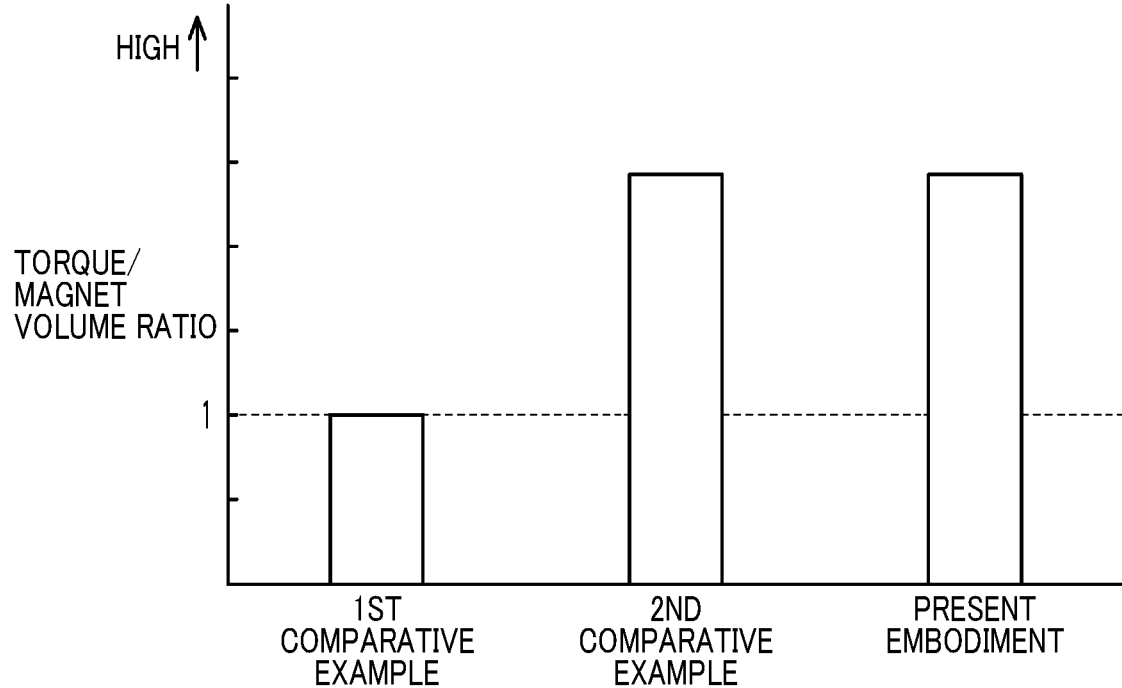
FIG. 6 is another explanatory diagram for explaining the characteristics of the rotor shown in FIG. 1.

FIG. 6 shows the results of a comparison made between the present embodiment and the first and second comparative examples in terms of the torque/magnet volume ratio; and the torque/magnet volume ratio is shown in a relative value that is 1 in the first comparative example. As described above, in the second comparative example, since the permanent magnets 23 have the deep folded shape and both the magnet surfaces 23d of the permanent magnets 23 and the outer core portions 25 are accordingly enlarged, the torque is increased as compared with the first comparative example. Consequently, the torque/magnet volume ratio becomes higher than 1.

On the other hand, in the present embodiment, each of the outer core portions 25 is supported at the three locations, i.e., at the newly-added connection portions 31c as well as at the two connection portions 22d. The connection portions 22d and 31c are also portions where leakage of the magnetic flux of the permanent magnets 23 occurs. Therefore, due to the newly-added connection portions 31c, the effective magnetic flux may be reduced and thus the torque/magnet volume ratio may be lowered. In the present embodiment, as a countermeasure against the above problem, the axial end portions of the permanent magnets 23 are configured to protrude from the axial end faces 22c of the rotor core 22, forming the protruding portions 23x. By causing magnetic flux leakage through the axial end faces 22c of the rotor core 22 to occur mainly at the protruding portions 23x, it becomes possible to reduce magnetic flux leakage from the embedded magnet portions 23m of the permanent magnets 23 which is of vital importance; i.e., it becomes possible to increase the effective magnetic flux. Consequently, it becomes possible to achieve an increase in the torque. Furthermore, focusing on the fact that the magnetic flux leakage at the curved portions 23b of the permanent magnets 23 is small, the thickness Wm1 of the curved portions 23b of the permanent magnets 23 is set to be small, thereby minimizing the volume of the permanent magnets 23 and thus improving the torque/magnet volume ratio. As a result, in the present embodiment, although the magnetic flux leakage increases due to the newly-added connection portions 31c, it still becomes possible to achieve substantially the same torque/ magnet volume ratio as in the second comparative example where the magnet-receiving holes 24 have no connection portions.

In addition, even if the protruding portions 23x were not provided in the permanent magnets 23 and the thickness Wm1 of the curved portions 23b of the permanent magnets 23 was not set to be small, the torque/magnet volume ratio would not be lowered so much and still be higher than 1 (not shown). Therefore, in the case of the permanent magnets 23 being formed of an expensive magnet material, it is preferable to decide, in consideration of the magnet cost, whether to form the protruding portions 23x in the permanent magnets 23 and whether to adjust the thickness Wm1 of the curved portions 23b of the permanent magnets 23.

Next, advantageous effects achievable according to the present embodiment will be described.

(1) In the present embodiment, the core sheets 30 forming the rotor core 22 are identical in configuration to each other. In each of the core sheets 30, the first through-holes 31 and the second through-holes 32 coexist alternately in the circumferential direction. Each of the first through-holes 31 has the connection portion 31c formed at an intermediate position in the folded shape of the corresponding magnet-receiving hole 24 of the rotor core 22, more particularly at the curved portion 24b of the corresponding magnet-receiving hole 24 in the present embodiment. On the other hand, each of the second through-holes 32 has no connection portion. Moreover, the core sheets 30 are laminated so that each of the magnet-receiving holes 24 is constituted of a mixture of the first and second through-holes 31 and 32 of the core sheets 30. More specifically, the core sheets 30 are laminated so that those core sheets 30 which are arranged at the first position and those core sheets 30 which are arranged at the 45°-rotated second position alternate one by one. Consequently, each of the outer core portions 25 of the rotor core 22, which are located radially outside the permanent magnets 23, is supported with respect to the common portion 22x of the rotor core 22 at the three locations, i.e., the two locations where the two connection portions 22d are respectively formed outside the radially outer ends 24c of the corresponding magnet-receiving hole 24 and the location where the connection portions 31c of the first through-holes 31 are formed. That is, each of the outer core portions 25 is supported at the newly-added connection portions 31c as well as at the two connection portions 22d that are provided inevitably due to the configuration of the corresponding magnet-receiving hole 24 in the IPM rotor 20. As a result, the strength of the outer core portions 25 against the centrifugal force is improved. In addition, it becomes possible to realize the rotor and the rotating electric machine according to the present disclosure by the simple countermeasure of preparing only one type of the core sheets 30.

(2) In each of the core sheets 30, the first through-holes 31 and the second through-holes 32 are arranged alternately in the circumferential direction. Consequently, it becomes possible to realize the rotor and the rotating electric machine according to the present disclosure by the simple lamination manner of arranging every core sheet 30 at either the first position or the second position rotated from the first position by an angle corresponding to one magnet-receiving hole 24. Moreover, since every core sheet 30 is arranged at either the first position or the second position, the connection portions 31c of the first through-holes 31 are located in every other core sheet 30 and thus not overlaid on one another. Consequently, it becomes possible to minimize magnetic flux leakage through the connection portions 31c.

(3) In each of the first through-holes 31, the connection portion 31c is located at the curved portion 31b of the first through-hole 31 which has the folded shape. Hence, for each of the outer core portions 25, the connection portions 22d and 31c are arranged in a well-balanced manner around the outer core portion 25. Such an arrangement contributes to the stable support of the outer core portions 25.

(4) Each of the connection portions 31c provided in the first through-holes 31 has its width Wb set to be smaller than or equal to the thickness t of each of the core sheets 30. Consequently, it becomes possible to minimize magnetic flux leakage through the connection portions 31c.

(5) For each of the connection portions 31c provided in the first through-holes 31, the side edges 31d of the connection portion 31c are formed in the uniformly curved shape such that the width of the connection portion 31c decreases toward the central part in the extending direction of the connection portion 31c. Consequently, it becomes possible to set the width of the connection portion 31c to be large at end parts thereof and thereby increase the rigidity of the connection portion 31c while minimizing magnetic flux leakage through the connection portion 31c. Moreover, by forming the side edges 31d in the uniformly curved shape, it becomes possible to reduce stress concentration on the connection portion 31c.

(6) In the rotor core 22, the width of each of the radially outer ends 24c of the magnet-receiving holes 24 is reduced by forming the protruding portion 22e at the corner portion on one side of the radially outer end 24c. Consequently, it becomes possible to shorten the connection portions 22d on the radially outer side of the radially outer ends 24c of the magnet-receiving holes 24. This contributes to the improvement in the strength of the outer core portions 25 against the centrifugal force.

(7) The permanent magnets 23 have the axial end portions thereof protruding, as the protruding portions 23x, from the axial end faces 22c of the rotor core 22. Therefore, magnetic flux leakage through the axial end faces 22c of the rotor core 22 occurs mainly at the protruding portions 23x of the permanent magnets 23. That is, magnetic flux leakage from the embedded magnet portions 23m of the permanent magnets 23, which is of vital importance, can be reduced. Consequently, it becomes possible to increase the effective magnetic flux, thereby achieving an increase in the torque.

(8) Each of the permanent magnets 23 is formed in the folded shape to have the curved portion 23b; and the thickness Wm1 of the curved portion 23b is set to be smaller than the thickness Wm of the straight portions 23a. That is, focusing on the fact that the magnetic flux leakage at the curved portions 23b of the permanent magnets 23 is small, the curved portions 23b are made thinner than the straight portions 23a. Consequently, it becomes possible to minimize the volume of the permanent magnets 23, thereby improving the torque/magnet volume ratio.

The present embodiment can be modified and implemented as follows. Moreover, the present embodiment and the following modifications can also be implemented in combination with each other to the extent that there is no technical contradiction between them.

The magnet-receiving holes 24 and the configuration around the magnet-receiving holes 24 may be modified as appropriate.

Figure 7:
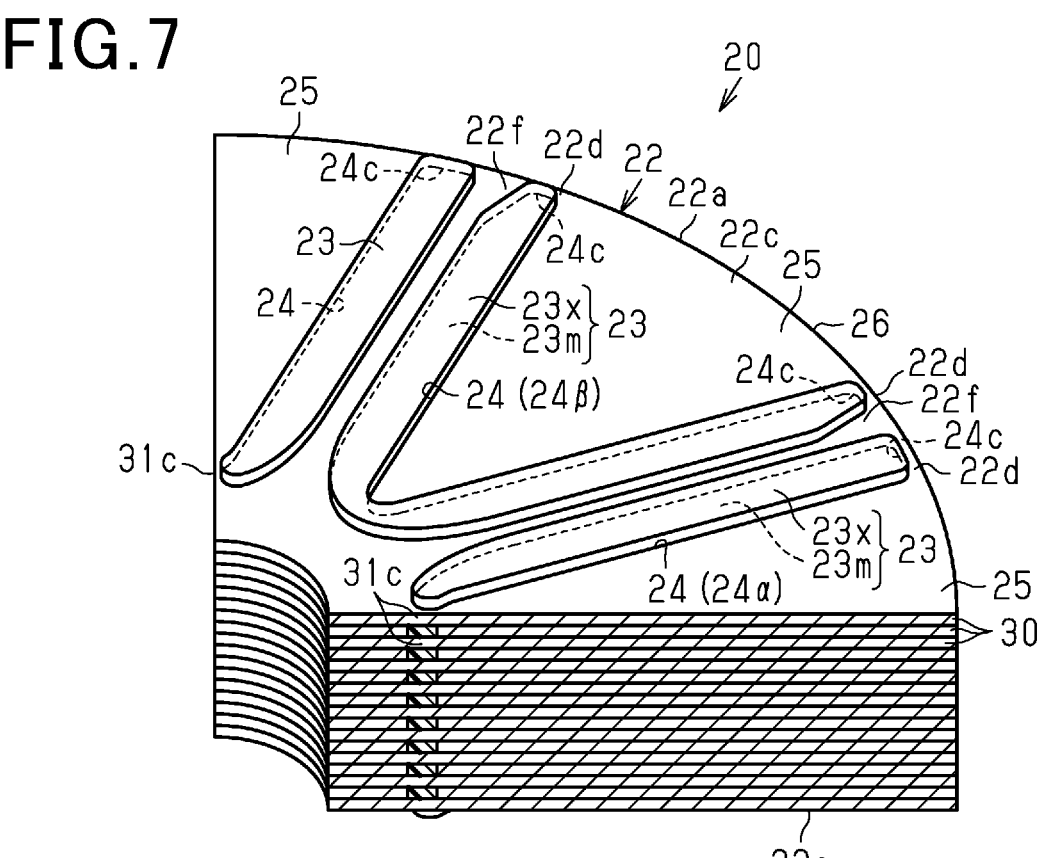
FIG. 7 is a perspective view of a rotor according to a modification.

For example, as shown in FIG. 7, at the radially outer ends 24c of the magnet-receiving holes 24, corner portions on the outer side of the folded substantially V-shape of the magnet-receiving holes 24 may protrude in a tapered shape to form protruding portions 22f. That is, the positions where the protruding portions 22f are formed are on the opposite side to the positions where the above-described protruding portions 22e are formed. In addition, as shown in FIG. 7, the protruding portions 22f may be formed only in the second-type magnet-receiving holes 24β; and the first-type magnet-receiving holes 24α may have a rectangular shape at the radially outer ends 24c thereof without the protruding portions 22f formed therein. That is, the protruding portions 22e or the protruding portions 22f may be formed in all or only some of the magnet-receiving holes 24 arranged in the circumferential direction.

Figure 8:
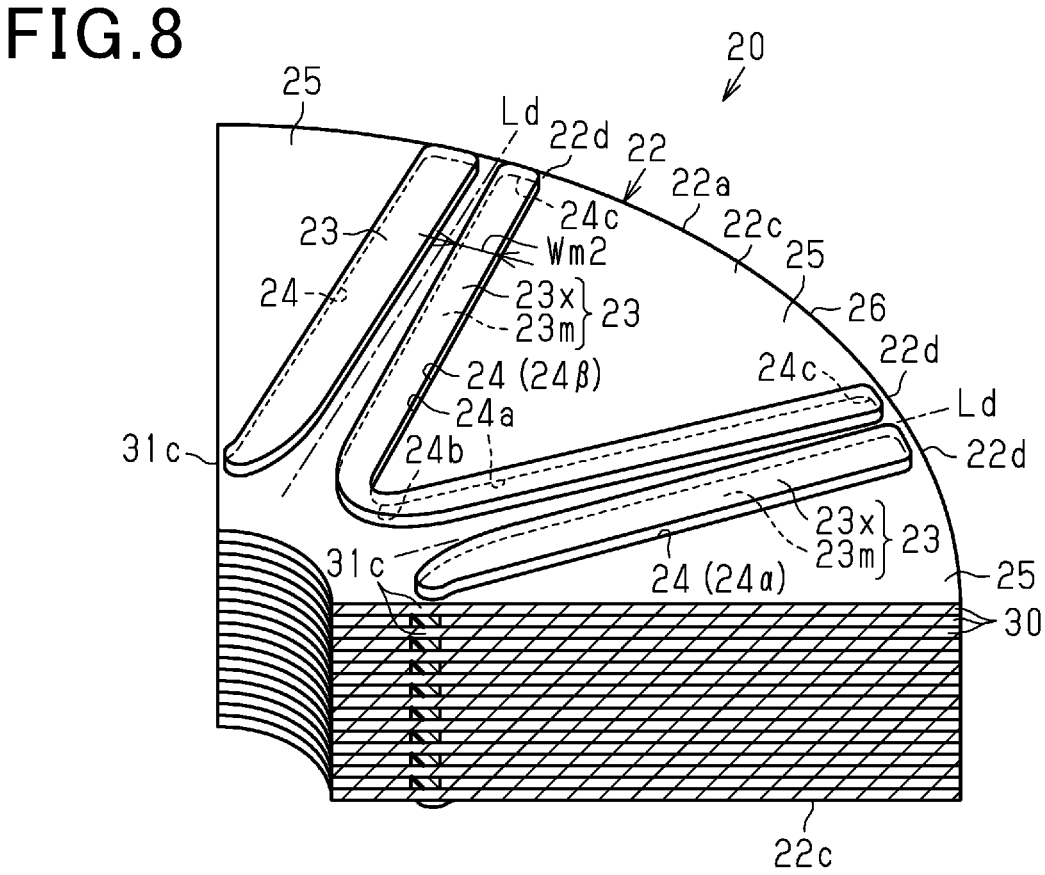
FIG. 8 is a perspective view of a rotor according to another modification.
Figure 9:
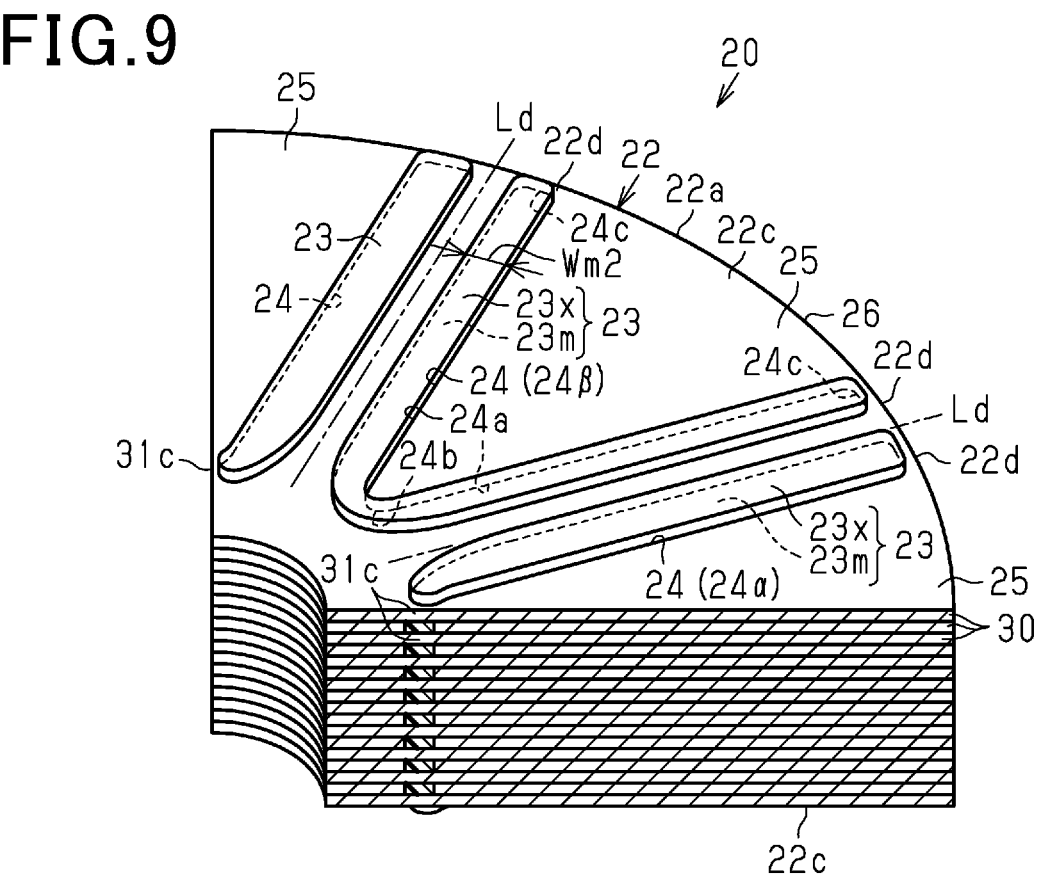
FIG. 9 is a perspective view of a rotor according to another modification.

Moreover, as shown in FIGS. 8 and 9, the width of the second-type magnet-receiving holes 24β (corresponding to a thickness Wm2 of the permanent magnets 23) may be set to be small. Further, as shown in FIG. 8, the second-type magnet-receiving holes 24β may be formed such that the distances between the straight portions 24a and the corresponding magnetic-pole boundary lines Ld increase as the straight portions 24a extend from the radially outer ends 24c to the curved portion 24b. In this case, the straight portions 24a of the second-type magnet-receiving holes 24β are oblique to the corresponding magnetic-pole boundary lines

13

14

Ld. Otherwise, as shown in FIG. 9, the second-type magnet-receiving holes 24β may be formed such that the distances between the straight portions 24a and the corresponding magnetic-pole boundary lines Ld are kept constant as the straight portions 24a extend from the radially outer ends 24c to the curved portion 24b. In this case, the straight portions 24a of the second-type magnet-receiving holes 24β are parallel to the corresponding magnetic-pole boundary lines Ld. It should be noted that the above modifications may alternatively be applied to the first-type magnet-receiving holes 24α.

Figure 10:
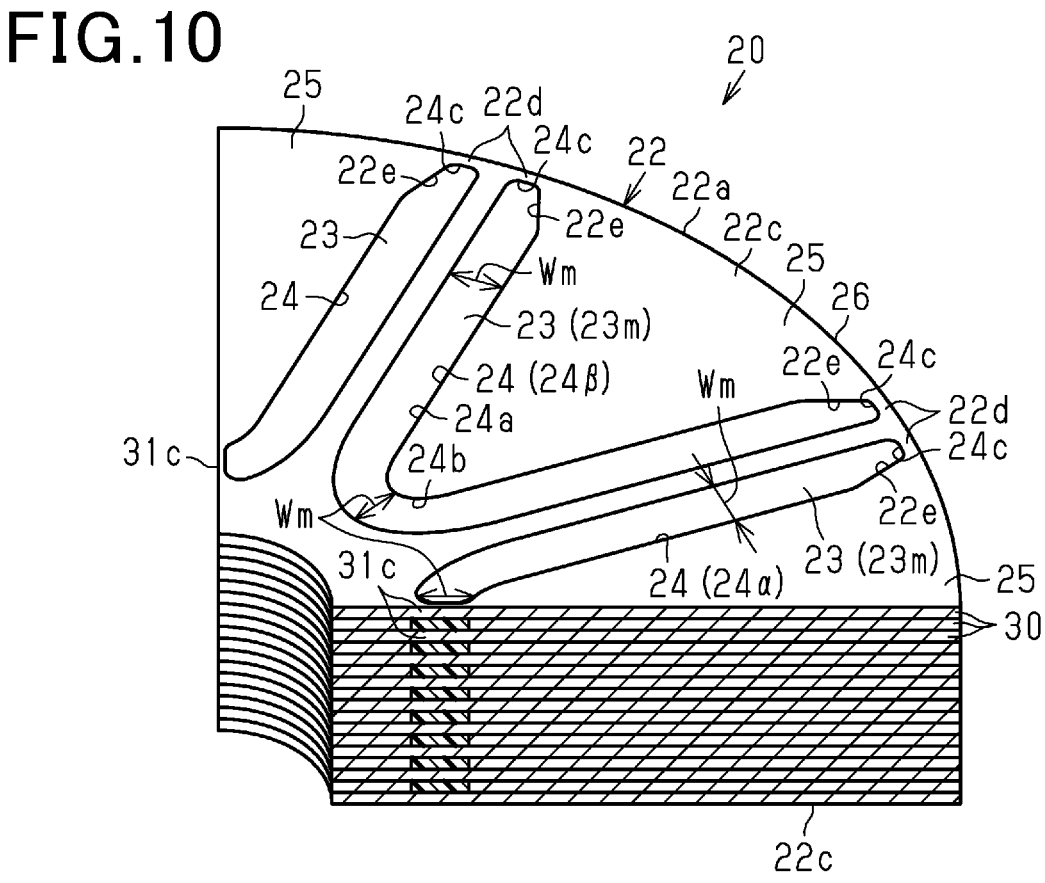
FIG. 10 is a perspective view of a rotor according to another modification.

As shown in FIG. 10, the protruding portions 23x may be omitted from the permanent magnets 23. In this case, the axial end portions of the permanent magnets 23 are flush with the corresponding axial end faces 22c of the rotor core 22. Further, as shown in FIG. 10, the width of the curved portions 24b of the magnet-receiving holes 24 (corresponding to the thickness Wm of the permanent magnets 23) may be set to be equal to the width of the straight portions 24a of the magnet-receiving holes 24.

In the above-described embodiment, the core sheets 30 are arranged in units of one core sheet alternately at the first position and the 45°-rotated second position. Alternatively, the core sheets 30 may be arranged in units of plural core sheets alternately at the first position and the 45°-rotated second position. In this case, the units of plural core sheets may be either units including the same number of core sheets or units including different numbers of core sheets.

In the above-described embodiment, in each of the core sheets 30, the first through-holes 31 and the second through-holes 32 are arranged alternately in the circumferential direction. That is, the first through-holes 31 are arranged at intervals of one second through-hole 32; and the second through-holes 32 are arranged at intervals of one first through-hole 31. However, the first through-holes 31 may alternatively be arranged at intervals of two or more second through-holes 32; otherwise, the second through-holes 32 may alternatively be arranged at intervals of two or more first through-holes 31.

In the above-described embodiment, in each of the first through-holes 31, there is provided one connection portion 31c. Alternatively, in each of the first through-holes 31, there may be provided two or more connection portions 31c. In this case, each of the outer core portions 25 is supported at four or more locations, i.e., at the newly-added connection portions 31c as well as at the two connection portions 22d that are provided inevitably due to the configuration of the magnet-receiving holes 24 of the rotor core 22. Moreover, in the above-described embodiment, in each of the first through-holes 31, the connection portion 31c is provided at the curved portion 31b of the first through-hole 31, i.e., at the curved portion 24b of the corresponding magnet-receiving hole 24. Alternatively, the connection portion(s) 31c may be provided at other portions of the first through-hole 31 than the curved portion 31b, more particularly at the straight portions 31a of the first through-hole 31 in the above-described embodiment. Furthermore, in the above-described embodiment, in each of the first through-holes 31, the connection portion 31c extends in the width direction of the first through-hole 31, i.e., extends perpendicular to the inner peripheral edges of the first through-hole 31, more particularly extends in a radial direction of the rotor 20. Alternatively, the connection portion(s) 31c may be suitably modified to extend in a direction oblique to the width direction of the first through-hole 31, i.e., in a direction other than the radial direction of the rotor 20.

The above-described protruding portions 22e and 22f, which are provided at the radially outer ends 24c of the magnet-receiving holes 24, protrude in the tapered shape. However, the protruding portions 22e and 22f may be suitably modified to protrude in other shapes, such as a rectangular shape, a curved shape or the like. Moreover, the protruding portions 22e and 22f may be omitted so that the magnet-receiving holes 24 have a rectangular shape at the radially outer ends 24c thereof as shown in FIG. 7.

In the above-described embodiment, the permanent magnets 23 are formed by injection-molding the magnet material into the magnet-receiving holes 24 of the rotor core 22. Alternatively, the permanent magnets 23 may be manufactured in advance and inserted into and fixed in the magnet-receiving holes 24 of the rotor core 22.

The number of magnetic poles of the rotor 20, i.e., the number of the permanent magnets 23 and the number of the magnet-receiving holes 24 may be changed as appropriate. Moreover, the number of magnetic poles of the stator 10 may also be changed as appropriate.

In addition to the above modifications, the configuration of the rotating electric machine M may also be modified as appropriate.

FIGS. 11 to 18 illustrate modifications where irregular portions are provided in the interior surfaces of the magnet-receiving holes 24.

Figure 11:
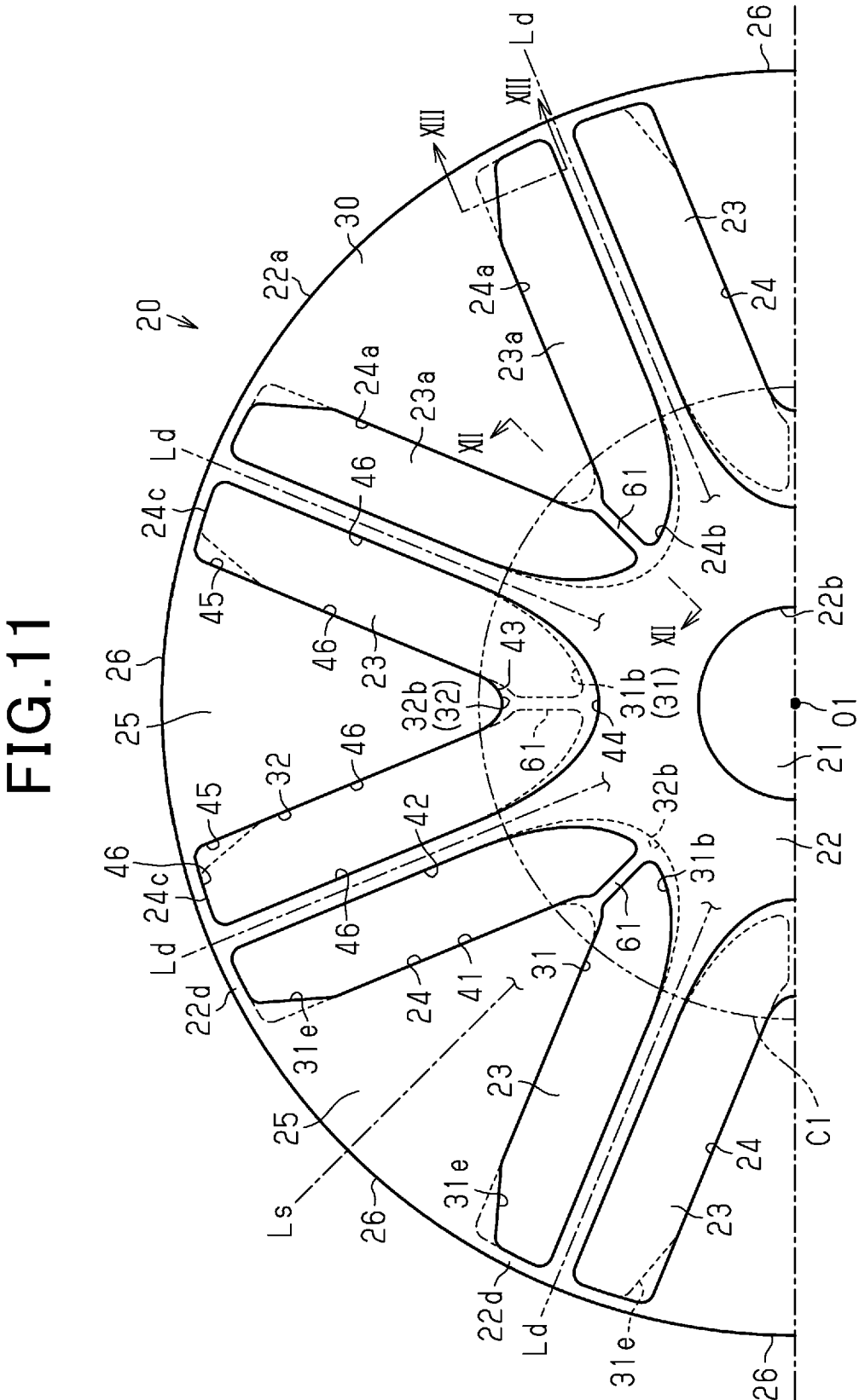
FIG. 11 is a plan view of a rotor according to another modification.

As shown in FIG. 11, each of the magnet-receiving holes 24 has the interior surfaces thereof in contact with the corresponding permanent magnet 23 received therein; the interior surfaces include an inner side surface 41 and an outer side surface 42. The inner side surface 41 is a side surface which defines the corresponding outer core portion 25 and which is in contact with the surface of the corresponding permanent magnet 23 on the inner side of the folded substantially V-shape of the corresponding permanent magnet 23. The outer side surface 42 is a side surface which faces the inner side surface 41 in a width direction of the magnet-receiving hole 24. It should be noted that the width direction of the magnet-receiving hole 24 is a direction which is perpendicular to an extending direction of the magnet-receiving hole 24 in an axial view. It also should be noted that the extending direction of the magnet-receiving hole 24 is a direction along the folded substantially V-shape of the magnet-receiving hole 24 in an axial view. Each of the inner side surface 41 and the outer side surface 42 is a surface which extends along the folded substantially V-shape of the magnet-receiving hole 24 in an axial view.

The inner side surface 41 has a first irregular portion 43. The outer side surface 42 has a second irregular portion 44. The first irregular portion 43 is provided in that part of the inner side surface 41 which is located at the curved portion 24b of the magnet-receiving hole 24. The second irregular portion 44 is provided in that part of the outer side surface 42 which is located at the curved portion 24b of the magnet-receiving hole 24. Moreover, third irregular portions 45 are provided in parts of the inner side surface 41 which are located respectively at the radially outer ends 24c of the pair of straight portions 24a of the magnet-receiving hole 24. Furthermore, in this modification, the interior surfaces of the magnet-receiving hole 24 also have non-irregular portions 46 where the first irregular portion 43, the second irregular portion 44 and the third irregular portions 45 are not formed. The first irregular portion 43, the second irregular portion 44 and the third irregular portions 45 are formed at some locations in the extending direction of the magnet-receiving hole 24, whereas the non-irregular portions 46 are formed at the other locations in the extending direction of the magnet-receiving hole 24.

Figure 14A:
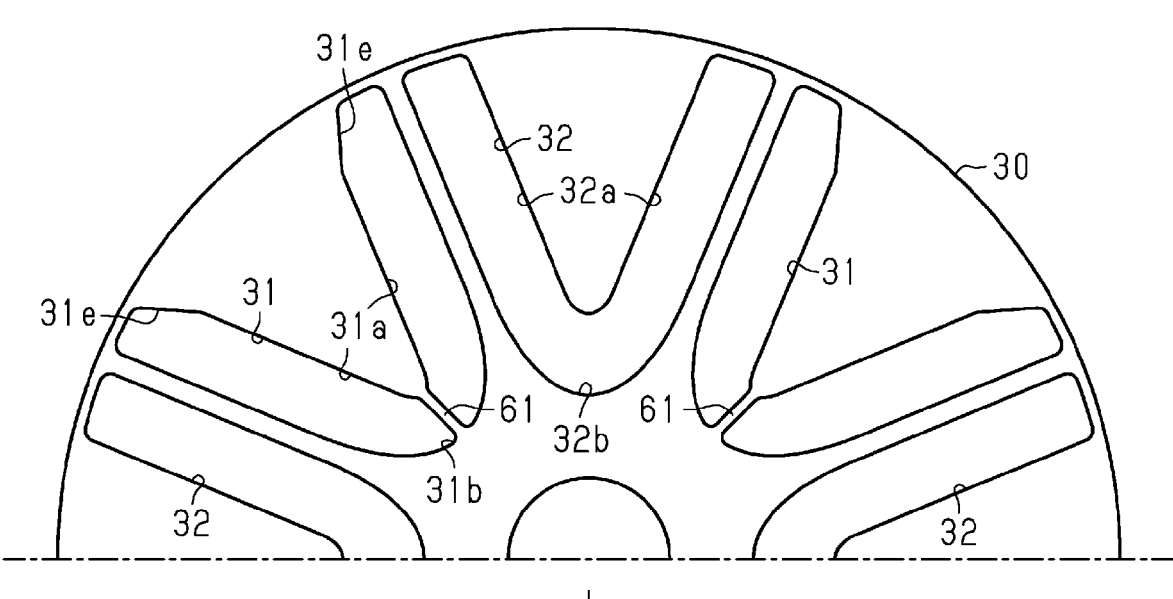
FIGS. 14(*a*) and 14(*b*) are plan views of a core sheet employed in the rotor shown in FIG. 11.

In this modification, all the core sheets 30 forming the rotor core 22 have the same configuration as shown in FIG. 14(a). Therefore, all the core sheets 30 can be managed as identical parts. In addition, the core sheet 30 shown in FIG. 14(b) appears at first glance to be different in shape from the core sheet 30 shown in FIG. 14(a). However, FIGS. 14(a) and 14(b) actually show the same core sheet 30 arranged at two different positions, i.e., at a first position in FIG. 14(a) and at a second position in FIG. 14(b); the second position is rotated with respect to the first position by an angle corresponding to one magnet-receiving hole 24, i.e., by 45° corresponding to one magnetic pole of the rotor 20.

Figure 14B:
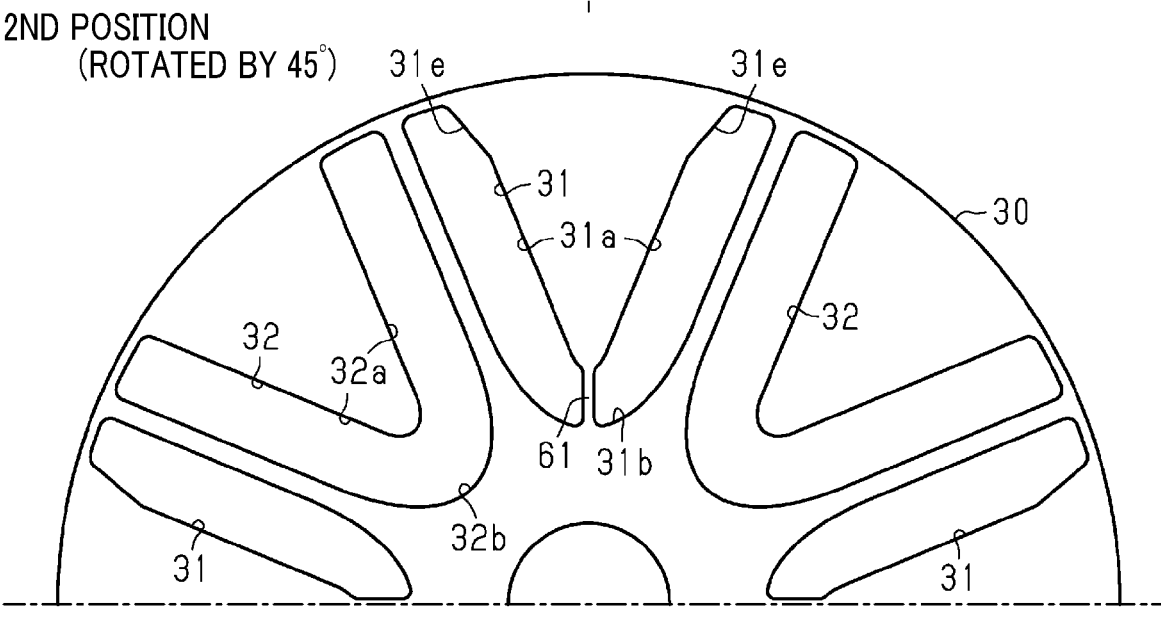

In this modification, in the process of laminating the core sheets 30 to form the rotor core 22, the core sheets 30 are laminated so that those core sheets 30 which are arranged at the first position shown in FIG. 14(a) and those core sheets 30 which are arranged at the 45°-rotated second position shown in FIG. 14(b) alternate in units of one core sheet. Consequently, in the resultant rotor core 22, each of the magnet-receiving holes 24 is constituted of a mixture of the first and second through-holes 31 and 32 of the core sheets 30; and the first and second through-holes 31 and 32 alternately overlap in the axial direction.

In this modification, in the interior surfaces of each of the magnet-receiving holes 24, the first irregular portion 43, the second irregular portion 44 and the third irregular portions 45 are each formed by the difference in position between peripheral edges of the first through-holes 31 and peripheral edges of the second through-holes 32.

Figure 12:
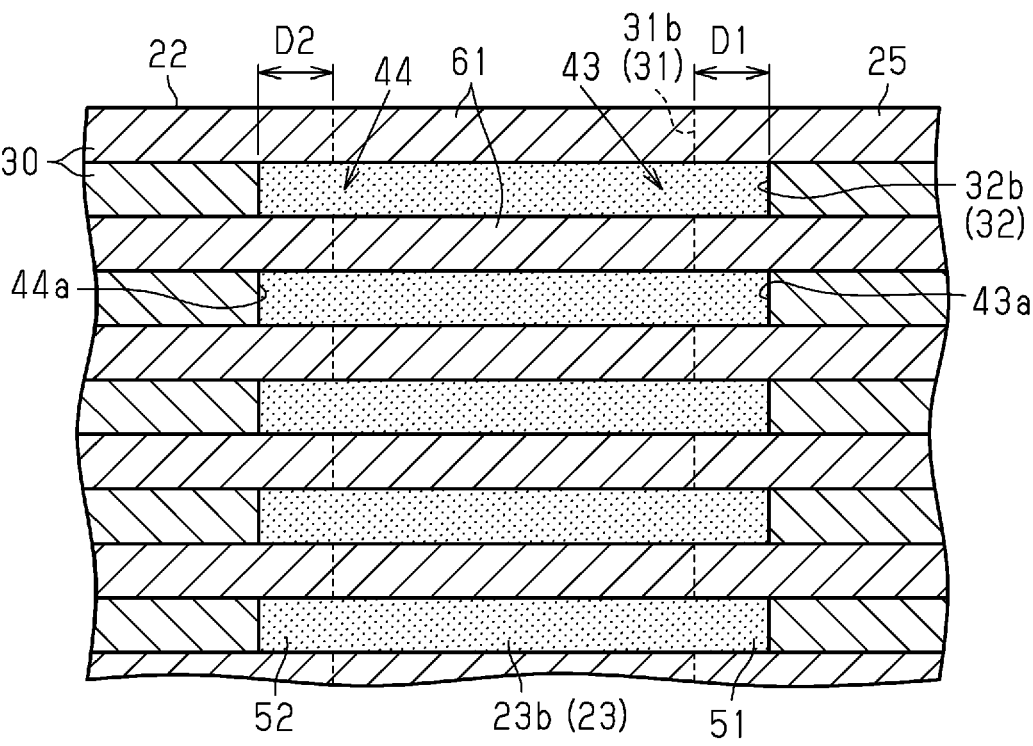
FIG. 12 is a cross-sectional view taken along the line XII-XII in FIG. 11.

As shown in FIGS. 11 and 12, in this modification, the width of the curved portions 31b of the first through-holes 31 is set to be smaller than the width of the curved portions 32b of the second through-holes 32. On the other hand, the radial center position of the curved portions 31b of the first through-holes 31 and the radial center position of the curved portions 32b of the second through-holes 32 are set to the same position. Consequently, in the interior surfaces of each of the magnet-receiving holes 24, the first irregular portion 43 and the second irregular portion 44 are formed by the difference between the width of the curved portions 31b of the first through-holes 31 and the width of the curved portions 32b of the second through-holes 32.

As shown in FIG. 12, the first irregular portion 43 has a plurality of recesses 43a in the axial direction. The corresponding permanent magnet 23, which is received in the magnet-receiving hole 24, has engaging portions 51 located respectively in the recesses 43a of the first irregular portion 43. The engaging portions 51 are axially retained with respect to the respective recesses 43a.

The second irregular portion 44 has a plurality of recesses 44a in the axial direction. The corresponding permanent magnet 23, which is received in the magnet-receiving hole 24, has engaging portions 52 located respectively in the recesses 44a of the second irregular portion 44. The engaging portions 52 are axially retained with respect to the respective recesses 44a. In this modification, the depth D1 of the recesses 43a of the first irregular portion 43 provided in the inner side surface 41 of the magnet-receiving hole 24 is set to be equal to the depth D2 of the recesses 44a of the second irregular portion 44 provided in the outer side surface 42 of the magnet-receiving hole 24. Moreover, each of the depth D1 of the recesses 43a and the depth D2 of the recesses 44a gradually decreases toward the straight portions 24a of the magnet-receiving hole 24.

The third irregular portions 45 are formed by the difference between the shape of the straight portions 31a of the first through-holes 31 and the shape of the straight portions 32a of the second through-holes 32 at the radially outer ends thereof. As shown in FIG. 14(a), at the radially outer end of each of the straight portions 31a of the first through-holes 31, there is formed a protruding portion 31e that protrudes inward in the width direction of the straight portion 31a. Specifically, at the radially outer end of each of the straight portions 31a of the first through-holes 31, the protruding portion 31e is formed by protruding a corner portion on the inner side of the folded substantially V-shape of the first through-hole 31. More specifically, the protruding portion 31e is formed by tapering the corner portion on the inner side of the folded substantially V-shape.

Figure 13:
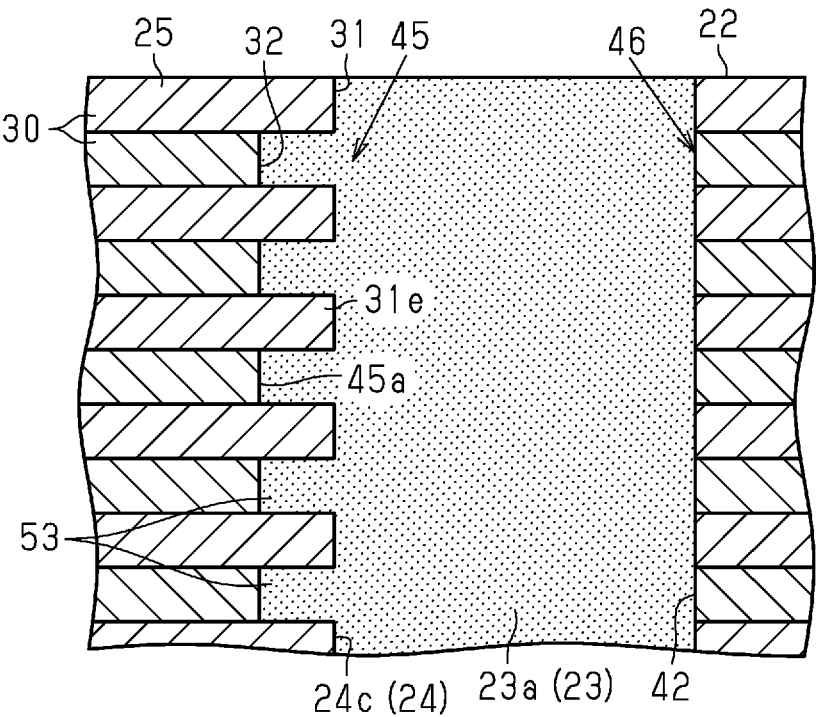
FIG. 13 is a cross-sectional view taken along the line XIII-XIII in FIG. 11.

As shown in FIG. 13, each of the third irregular portions 45 is formed by axially overlapping the straight portions 31a of the first through-holes 31 each of which has the protruding portion 31e provided therein and the straight portions 32a of the second through-holes 32 each of which has no protruding portion provided therein. Each of the third irregular portions 45 has a plurality of recesses 45a in the axial direction. The recesses 45a are formed of the straight portions 32a of the second through-holes 32 each of which has no protruding portion provided therein. Moreover, each of the third irregular portions 45 also has a plurality of protrusions in the axial direction. The protrusions are constituted of the protruding portions 31e provided in the straight portions 31a of the first through-holes 31. The corresponding permanent magnet 23, which is received in the magnet-receiving hole 24, has engaging portions 53 located respectively in the recesses 45a of the third irregular portions 45. The engaging portions 53 are axially retained with respect to the respective recesses 45a. It should be noted that the protruding portions 31e may be formed in the second through-holes 32 instead of the first through-holes 31.

As shown in FIG. 11, the non-irregular portions 46 are those portions of the interior surfaces of each of the magnet-receiving holes 24 where the first irregular portion 43, the second irregular portion 44 and the third irregular portions 45 are not formed. That is, when each of the magnet-receiving holes 24 is viewed in the axial direction, all the peripheral edges of the axially-overlapping first and second through-holes 31 and 32 coincide with each other at the non-irregular portions 46.

Moreover, as shown in FIG. 11, in the rotor core 22, for each of the magnet-receiving holes 24, connection portions 61 are formed at an intermediate position in the folded shape of the magnet-receiving hole 24 to connect inner peripheral edges of the magnet-receiving hole 24 with each other; the inner peripheral edges face each other in a width direction of the magnet-receiving hole 24. More particularly, in this modification, the connection portions 61 are formed at the curved portion 24b of the magnet-receiving hole 24.

In this modification, of the first through-holes 31 and the second through-holes 32, the connection portions 61 are formed in only in the first through-holes 31. Specifically, each of the connection portions 61 is formed at the curved portion 31b of one of the first through-holes 31. More specifically, each of the connection portions 61 extends in a width direction of the curved portion 31b to connect inner peripheral edges of the curved portion 31b with each other; the inner peripheral edges face each other in the width direction of the curved portion 31b. Moreover, all the widths of the connection portions 61 of the first through-holes 31 in the directions perpendicular to the extending directions of the connection portions 61 are set to be equal to each other. In addition, in a state where the core sheets 30 have been laminated to form the rotor core 22, in each of the magnet-receiving holes 24, all the connection portions 61 are arranged in alignment with each other in the axial direction.

Moreover, in this modification, as described above, the width of the curved portions 31*b* of the first through-holes 31 is set to be smaller than the width of the curved portions 32*b* of the second through-holes 32. Consequently, by forming the connection portions 61 at the curved portions 31*b* of the first through-holes 31, it becomes possible to reduce the length of the connection portions 61 in the width direction of the curved portions 31*b* and 32*b* as compared with the case of forming connection portions at the curved portions 32*b* of the second through-holes 32.

Furthermore, in this modification, no connection portions are formed in the second through-holes 32. Therefore, at the curved portion 24*b* of each of the magnet-receiving holes 24, there is, in every other core sheet 30, a location where no connection portion is formed. In the process of forming the permanent magnets 23, the magnet material flows into the location where no connection portion is formed. In addition, in each of the magnet-receiving holes 24, the connection portions 61 are formed between the first irregular portion 43 and the second irregular portion 44. In other words, the connection portions 61 connect the first irregular portion 43 and the second irregular portion 44 with each other.

With the configuration shown in FIGS. 11 to 13, each of the outer core portions 25 is supported at three locations, i.e., at two connection portions 22*d* that are provided inevitably due to the configuration of the corresponding magnet-receiving hole 24 and at the curved portion 24*b* of the corresponding magnet-receiving hole 24 where the connection portions 61 are newly added. Consequently, the strength of the outer core portions 25 against the centrifugal force is improved. Moreover, for each of the outer core portions 25, the connection portions 22*d* and 61 supporting the outer core portion 25 are arranged in a well-balanced manner around the outer core portion 25. Such an arrangement contributes to the stable support of the outer core portions 25.

In the rotor 20 which employs the permanent magnets 23 having the folded shape that is convex radially inward, the volume of the outer core portions 25 located radially outside the permanent magnets 23 becomes large. Moreover, in the case where the radially outer ends of the permanent magnets 23 are located near the outer circumferential surface 22*a* of the rotor core 22 in order to increase the torque, the thickness of the connection portions 22*d* becomes small and thus the strength of the connection portions 22*d* tends to be lowered. Therefore, when an axial excitation force is applied to the rotor 20 due to, for example, an external factor, a force is generated to cause the outer core portions 25 to vibrate in the axial direction with the connection portions 22*d* serving as fulcrums. Consequently, a load will be imposed on the connection portions 61; thus, the connection portions 61 may be deformed if no countermeasure is taken.

In this regard, with the configuration shown in FIGS. 11 to 13, each of the permanent magnets 23, which are constituted of bonded magnets filled in the magnet-receiving holes 24, engages with the first irregular portion 43, the second irregular portion 44 and the third irregular portions 45 of the corresponding magnet-receiving hole 24 in a manner similar to a so-called anchor effect. That is, each of the outer core portions 25 axially engages, by the first irregular portion 43 and the third irregular portions 45 of the corresponding magnet-receiving hole 24, with the inside surface of the substantially V-shaped permanent magnet 23 that is received in the corresponding magnet-receiving hole 24. On the other hand, the outside surface of the substantially V-shaped permanent magnet 23 axially engages, by the second irregular portion 44 of the corresponding magnet-receiving hole 24, with a portion of the rotor core 22 other than the outer core portions 25. Consequently, when an axial excitation force is applied to the rotor 20 due to, for example, an external factor, it is possible to suppress the outer core portions 25 from vibrating in the axial direction with the connection portions 22*d* serving as fulcrums. As a result, it is possible to reduce the load imposed on the connection portions 61. In the above manner, deformation of the connection portions 61 due to axial vibration of the outer core portions 25 can be suppressed by the first, second and third irregular portion 43, 44 and 45 of the magnet-receiving holes 24. That is, the configuration according to this modification can contribute to both improvement in the strength of the outer core portions 25 against the centrifugal force and improvement in the axial strength of the outer core portions 25.

Moreover, in this modification, the interior surfaces of each of the magnet-receiving holes 24 also have the non-irregular portions 46 where the first irregular portion 43, the second irregular portion 44 and the third irregular portions 45 are not formed. Consequently, compared to a configuration where irregular portions are formed over the entire interior surfaces of the magnet-receiving holes 24, it becomes possible to suppress axial leakage magnetic flux generated due to the irregular boundaries between the magnet-receiving holes 24 and the permanent magnets 23.

Furthermore, in this modification, the interior surfaces of each of the magnet-receiving holes 24 include the inner side surface 41 that defines the corresponding outer core portion 25 and the outer side surface 42 that faces the inner side surface 41 in the width direction of the magnet-receiving hole 24. In the inner side surface 41, there are formed the first irregular portion 43 and the third irregular portions 45. On the other hand, in the outer side surface 42, there is formed the second irregular portion 44. With the above configuration, since each of the inner side surface 41 and the outer side surface 42 has irregularity, vibration of the corresponding outer core portion 25 can be more effectively suppressed by the irregularity. Moreover, since the non-irregular portions 46 are formed in each of the inner side surface 41 and the outer side surface 42, it becomes possible to more suitably achieve the effect of suppressing leakage magnetic flux by the non-irregular portions 46.

Furthermore, in this modification, the first irregular portion 43 and the second irregular portion 44 are provided within the region of a reference circle C1 whose diameter is half the outer diameter of the rotor core 22. The reference circle C1 is a circle centering on the axis center O1 of the rotor 20. The region delimited by the reference circle C1 is a radially inner region in the rotor core 22, i.e., a region that hardly contributes to the output torque. Therefore, by providing the first irregular portion 43 within the region of the reference circle C1, it becomes possible to suppress decrease in the output torque due to the provision of the first irregular portion 43.

Furthermore, in this modification, for each of the magnet-receiving holes 24 having the folded shape, both the first irregular portion 43 and the second irregular portion 44 are provided at the curved portion 24*b* of the magnet-receiving hole 24. With the above configuration, it becomes possible to axially engage radially inner end parts of the outer core portions 25, which are located away from the connection portions 22 *d*, with the permanent magnets 23 by the first and second irregular portions 43 and 44 of the magnet-receiving holes 24. Consequently, it becomes possible to effectively suppress the outer core portions 25 from vibrating in the axial direction with the connection portions 22d serving as fulcrums.

Furthermore, in this modification, the third irregular portions 45 are provided at the radially outer ends 24c of the magnet-receiving holes 24. With the above configuration, it becomes possible to suppress vibration of the outer core portions 25 in the vicinities of radially outer end parts of the outer core portions 25. Moreover, the protrusions of the third irregular portions 45 are constituted of the protruding portions 31e that protrude inward in the width directions of the magnet-receiving holes 24. The protruding portions 31e are formed in the first through-holes 31. Consequently, it becomes possible to reduce the circumferential length of the connection portions 22d corresponding to the first through-holes 31. As a result, the formability of the core sheets 30 can be improved.

Furthermore, in this modification, the protruding portions 31e are formed, at the radially outer ends of the straight portions 31a of the first through-holes 31, by protruding the corner portions on the inner side of the folded substantially V-shape of the first through-holes 31. Consequently, it becomes possible to form the third irregular portions 45 by the protruding portions 31e while minimizing decrease in the magnetic flux of the permanent magnets 23. Further, by minimizing decrease in the magnetic flux of the permanent magnets 23 while reducing the volume of the permanent magnets 23 through the provision of the protruding portions 31e, it becomes possible to improve the output torque per unit volume of the permanent magnets 23.

Furthermore, in this modification, the core sheets 30 forming the rotor core 22 are identical in configuration to each other. In each of the core sheets 30, the first through-holes 31 and the second through-holes 32, which are different in shape from each other, coexist alternately in the circumferential direction. Moreover, the core sheets 30 are laminated so that each of the magnet-receiving holes 24 is constituted of a mixture of the first and second through-holes 31 and 32 of the core sheets 30. As a result, it becomes possible to facilitate parts management by forming the core sheets 30 to be identical in configuration to each other; it also becomes possible to form the first irregular portion 43, the second irregular portion 44 and the third irregular portions 45 in each of the magnet-receiving holes 24 by the axially-overlapping first and second through-holes 31 and 32.

In addition, in this modification, it also becomes possible to minimize magnetic imbalance that may occur due to the coexistence of the first through-holes 31 and the second through-holes 32, which are different in shape from each other, in each of the core sheets 30.

In the above-described modification shown in FIG. 11, in the interior surfaces of each of the magnet-receiving holes 24, the first irregular portion 43 and the second irregular portion 44 are formed by the difference between the width of the curved portions 31b of the first through-holes 31 and the width of the curved portions 32b of the second through-holes 32. However, the formation of the first irregular portion 43 and the second irregular portion 44 is not particularly limited to this modification, but may be changed as appropriate.

Figure 15:
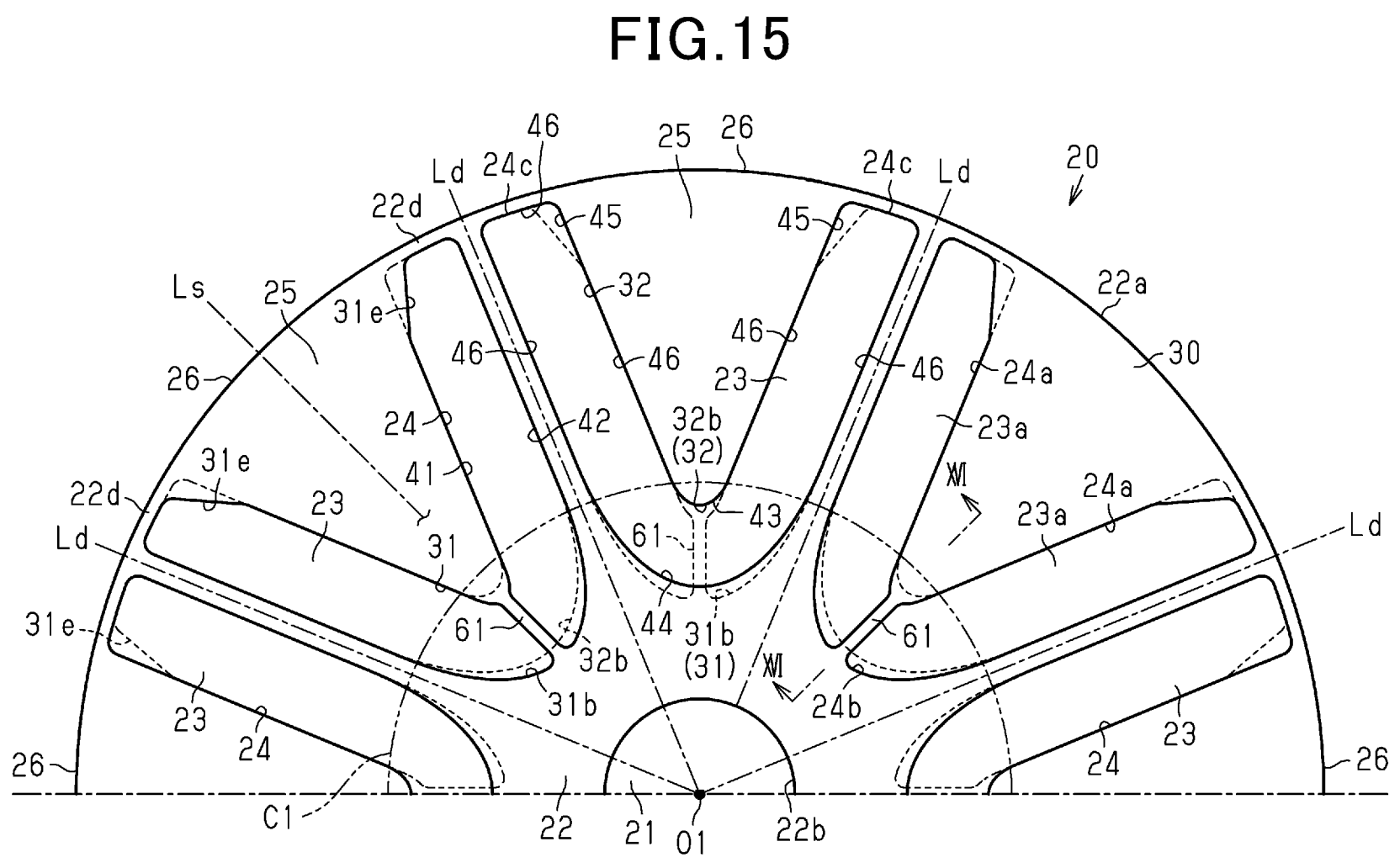
Figure 16:
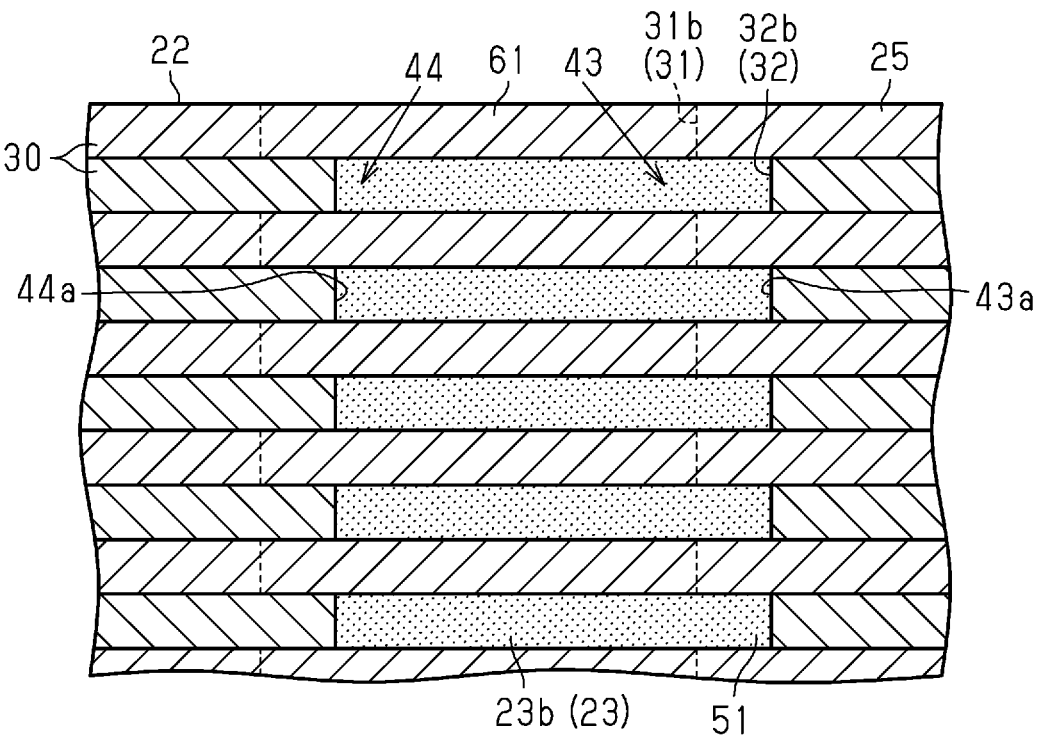
FIG. 16 is a cross-sectional view taken along the line XVI-XVI in FIG. 15.

For example, as shown in FIGS. 15 and 16, the radial width of the curved portions 31b of the first through-holes 31 and the radial width of the curved portions 32b of the second through-holes 32 may be set to be equal to each other; and the first irregular portion 43 and the second irregular portion 44 may be formed by the difference in radial position between the curved portions 31b of the first through-holes 31 and the curved portions 32b of the second through-holes 32. More specifically, in the modification shown in FIGS. 15 and 16, the first irregular portion 43 and the second irregular portion 44 are formed by locating the curved portions 31b of the first through-holes 31 radially inside the curved portions 32b of the second through-holes 32.

With such a configuration, it is possible to achieve substantially the same advantageous effects as achievable with the configuration shown in FIG. 11. Moreover, with the configuration shown in FIG. 15, it is possible to form the first irregular portion 43 and the second irregular portion 44 in the interior surfaces of each of the magnet-receiving holes 24 while preventing the magnetic properties of the permanent magnets 23 formed in the respective magnet-receiving holes 24 from becoming different from each other. It should be noted that it is also possible to combine a configuration where the positions of the curved portions 31b and 32b are set to be different from each other and a configuration where the widths of the curved portions 31b and 32b are set to be different from each other.

Figure 17:
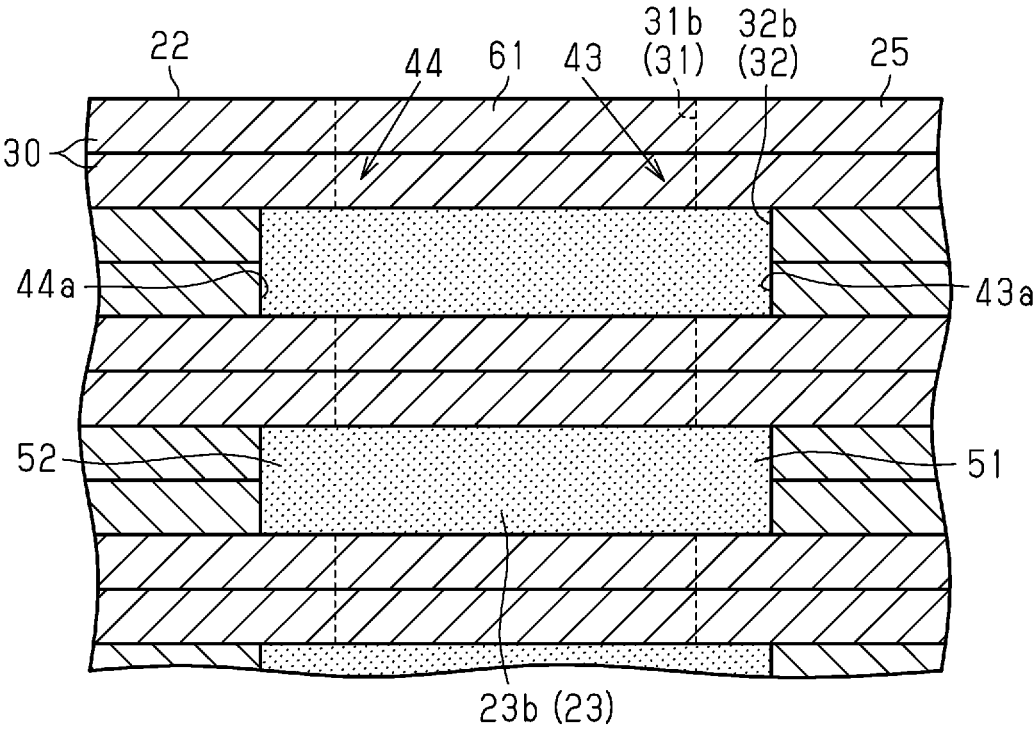
FIG. 17 is a cross-sectional view of a rotor according to another modification.

In the above-described modifications, the core sheets 30 are arranged in units of one core sheet alternately at the first position and the 45°-rotated second position. Alternatively, the core sheets 30 may be arranged in units of plural core sheets alternately at the first position and the 45°-rotated second position. In this case, the units of plural core sheets may be either units including the same number of core sheets or units including different numbers of core sheets. For example, FIG. 17 shows a configuration where the core sheets 30 are arranged in units of two core sheets alternately at the first position and the 45°-rotated second position. With such a configuration, it is possible to achieve substantially the same advantageous effects as achievable with the configurations according to the above-described modifications.

In the above-described modifications, the positions of forming the irregular portions in the interior surfaces of the magnet-receiving holes 24 may be changed as appropriate. For example, in the interior surfaces of the magnet-receiving holes 24, irregular portions may be formed at intermediate parts of the straight portions 24a of the magnet-receiving holes 24 in an axial view.

In the above-described modifications, any one of the first irregular portion 43, the second irregular portion 44 and the third irregular portions 45 may be omitted from the magnet-receiving holes 24. Moreover, in the above-described modifications, each of the connection portions 61 is formed between the first irregular portion 43 and the second irregular portion 44 of the corresponding magnet-receiving hole 24. Alternatively, each of the connection portions 61 may be formed between the non-irregular portions 46 of the corresponding magnet-receiving hole 24.

In the above-described modifications, in the interior surfaces of each of the magnet-receiving holes 24, the first irregular portion 43, the second irregular portion 44 and the third irregular portions 45 are formed at some locations in the extending direction of the magnet-receiving hole 24; and the non-irregular portions 46 are formed at the other locations in the extending direction of the magnet-receiving hole 24. Alternatively, in the interior surfaces of each of the magnet-receiving holes 24, irregular portions may be formed at some locations in the axial direction; and non-irregular portions may be formed at the other locations in the axial direction.

Figure 18:
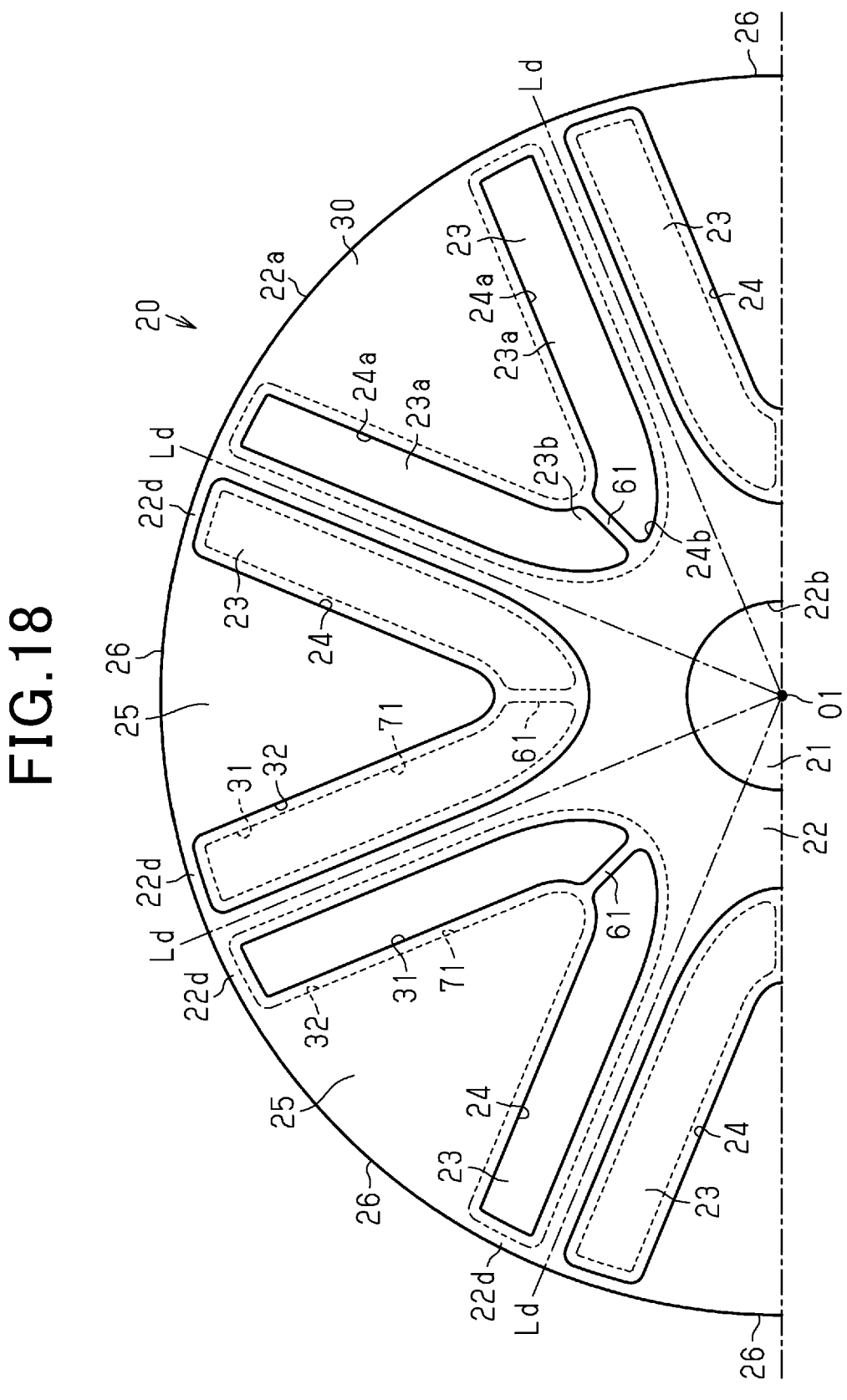
FIG. 18 is a plan view of a rotor according to another modification.

Otherwise, as shown in FIG. 18, irregular portions 71 may be formed over the entire interior surfaces of the magnet-receiving holes 24. In the configuration shown in FIG. 18, the first through-holes 31 have a shape slightly smaller than that of the second through-holes 32. The irregular portions 71 are formed over the entire interior surfaces of the magnet-receiving holes 24 by axially overlapping the first through-holes 31 and the second through-holes 32 that have the different shapes. With such a configuration, it is possible to secure a large area of the irregular portions 71 formed in the interior surfaces of the magnet-receiving holes 24. As a result, it is possible to more suitably suppress axial vibration of the outer core portions 25.

In the above-described modifications, one connection portion 61 is provided in each of the first through-holes 31. Alternatively, two or more connection portions may be provided in each of the first through-holes 31. In this case, each of the outer core portions 25 will be supported at four or more locations, i.e., at two connection portions 22*d* that are provided inevitably due to the configuration of the corresponding magnet-receiving hole 24 and two or more locations where the two or more connection portions are newly added.

In the above-described modifications, the connection portions 61 are provided at the curved portions 24*b* of the magnet-receiving holes 24. Alternatively, the connection portions 61 may be provided at the straight portions 24*a* of the magnet-receiving holes 24. Moreover, in the above-described modifications, the connection portions 61 extend in the width directions of the curved portions 24*b* of the magnet-receiving holes 24, i.e., in the radial directions of the rotor 20. Alternatively, the connection portions 61 may be suitably modified to extend in directions oblique to the width directions of the curved portions 24*b* of the magnet-receiving holes 24, i.e., directions other than the radial directions of the rotor 20.

In the above-described embodiment and modifications, in each of the core sheets 30, the number of the first through-holes 31 is set to be equal to the number of the second through-holes 32. Alternatively, in each of the core sheets 30, the number of the first through-holes 31 may be set to be larger or smaller than the number of the second through-holes 32. In addition, regardless of the number of the first through-holes 31 and the number of the second through-holes 32, the first through-holes 31 and the second through-holes 32 may be shaped so as to be point-symmetrical with respect to the axis center O1 of the rotor 20, thereby suppressing magnetic imbalance in the circumferential direction.

Figure 19:
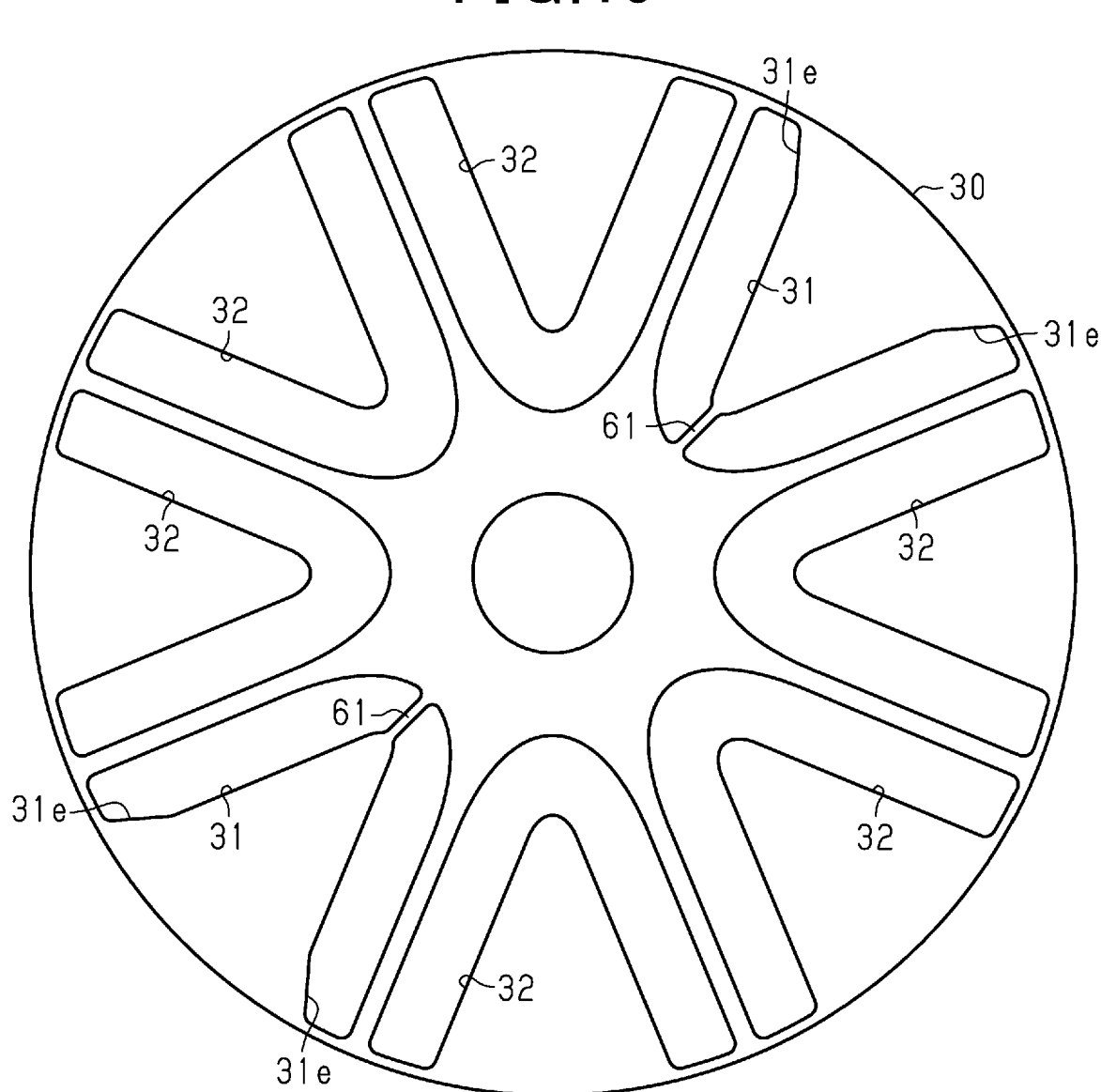
FIG. 19 is a plan view of a core sheet employed in a rotor according to another modification.

For example, in a modification shown in FIG. 19, in each of the core sheets 30, there are formed two first through-holes 31 and four second through-holes 32. The two first through-holes 31 are located apart from each other by 180° in the circumferential direction, so as to face each other. Consequently, it becomes possible to suppress magnetic imbalance in the circumferential direction. Moreover, in the modification shown in FIG. 19, the width of the curved portions 31*b* of the first through-holes 31 is smaller than the width of the curved portions 32*b* of the second through-holes 32. That is, the thickness of the curved portions 23*b* of the permanent magnets 23 is smaller in the first through-holes 31 than in the second through-holes 32. Therefore, by setting the number of the first through-holes 31 to be smaller than the number of the second through-holes 32, it is possible to suppress decrease in the output torque.

In the above-described embodiment and modifications, in the process of laminating the core sheets 30 to form the rotor core 22, each of the core sheets 30 is rotated by 45° corresponding to one magnetic pole. Alternatively, in the laminating process, each of the core sheets 30 may be rotated by an angle other than 45°, such as an angle corresponding to two magnetic poles or an angle corresponding to three magnetic poles.

Next, technical ideas that can be grasped from the above-described embodiment and modifications will be described.

(A) In the interior surfaces of the magnet-receiving holes, there are provided: the irregular portions (43, 44, 45) each of which is formed by the difference in position between the peripheral edges of the first and second through-holes that overlap in the axial direction; and the non-irregular portions (46) where the irregular portions are not formed.

With the above configuration, since there are provided the non-irregular portions 46 in the interior surfaces of the magnet-receiving holes, it becomes possible to suppress axial leakage magnetic flux generated due to the irregular boundaries between the magnet-receiving holes and the permanent magnets as compared with a configuration where irregular portions are formed over the entire interior surfaces of the magnet-receiving holes.

(B) The rotor core has the outer core portions located radially outside the permanent magnets. The interior surfaces of each of the magnet-receiving holes include the inner side surface (41) that defines the corresponding outer core portion and the outer side surface (42) that faces the inner side surface in the width direction of the magnet-receiving hole. The irregular portions are provided in both the inner side surface and the outer side surface. The non-irregular portions are also provided in both the inner side surface and the outer side surface.

With the above configuration, since the irregular portions are provided in both the inner and outer side surfaces of each of the magnet-receiving holes, vibration of the outer core portions can be more effectively suppressed by the irregular portions. Moreover, since the non-irregular portions are provided in both the inner and outer side surfaces of each of the magnet-receiving holes, the leakage magnetic flux can be more suitably suppressed by the non-irregular portions.

(C) The irregular portions are provided radially inward of a half of the outer diameter of the rotor core.

With the above configuration, the region located radially inward of a half of the outer diameter of the rotor core is a region that hardly contributes to the output torque. Therefore, by providing the irregular portions in the region, it becomes possible to suppress decrease in the output torque due to the provision of the irregular portions.

(D) The irregular portions are provided at the curved portions (24*b*) of the magnet-receiving holes that are formed in the folded shape.

With the above configuration, it becomes possible to axially engage radially inner end parts of the outer core portions with the permanent magnets by the irregular portions provided at the curved portions of the magnet-receiving holes. Consequently, it becomes possible to effectively suppress axial vibration of the outer core portions by the irregular portions.

(E) The irregular portions are provided at the radially outer ends (24*c*) of the magnet-receiving holes.

With the above configuration, it becomes possible to suppress vibration of the outer core portions in the vicinities of radially outer end parts of the outer core portions.

(F) The protrusions of the irregular portions provided at the radially outer ends of the magnet-receiving holes are constituted of the protruding portions (31e) that protrude inward in the width directions of the magnet-receiving holes 24.

With the above configuration, it becomes possible to partially reduce, by providing the protruding portions, the circumferential length of the connection portions formed near the radially outer ends of the magnet-receiving holes. As a result, the formability of the core sheets can be improved.

(G) The protruding portions are formed, at the radially outer ends of the magnet-receiving holes, by protruding the corner portions on the inner side of the folded shape of the magnet-receiving holes.

With the above configuration, it becomes possible to form the irregular portions by the protruding portions while minimizing decrease in the magnetic flux of the permanent magnets. Further, by minimizing decrease in the magnetic flux of the permanent magnets while reducing the volume of the permanent magnets through the provision of the protruding portions, it becomes possible to improve the output torque per unit volume of the permanent magnets.

(H) In each of the core sheets, the widths of the connection portions of the first through-holes in the directions perpendicular to the extending directions of the connection portions are set to be equal to each other.

With the above configuration, in a state where the core sheets have been laminated to form the rotor core, in each of the magnet-receiving holes, all the connection portions are arranged in alignment with each other in the axial direction. Consequently, when an axial excitation force is applied to the outer core portions, a load will be imposed substantially evenly on all the connection portions in each of the magnet-receiving holes. As a result, deformation of the connection portions can be suitably suppressed.

While the present disclosure has been described pursuant to the embodiment, it should be appreciated that the present disclosure is not limited to the embodiment and the structure. Instead, the present disclosure encompasses various modifications and changes within equivalent ranges. In addition, various combinations and modes are also included in the category and the scope of technical idea of the present disclosure.

What is claimed is:

1. A rotor comprising:
a rotor core including a plurality of core sheets that are laminated together and having a plurality of magnet-receiving holes formed in a folded shape that is convex radially inward; and
a plurality of permanent magnets embedded respectively in the magnet-receiving holes of the rotor core,
wherein:
each of the plurality of core sheets has a plurality of first through-holes and a plurality of second through-holes, each of the first through-holes having a connection portion formed at an intermediate position in the folded shape of a corresponding one of the magnet-receiving holes to connect inner peripheral edges of the first through-hole that face each other in a width direction of the first through-hole, each of the second through-holes having no connection portion;
the plurality of core sheets are identical in configuration to each other;
the plurality of core sheets are laminated so that each of the magnet-receiving holes of the rotor core is constituted of a mixture of the first and second through-holes of the plurality of core sheets;

each of the plurality of permanent magnets is a bonded magnet;
interior surfaces of the magnet-receiving holes have irregular portions each of which is formed by a difference in position between peripheral edges of the first and second through-holes that overlap in an axial direction; and
the permanent magnets have engaging portions located respectively in recesses of the irregular portions.

2. The rotor as set forth in claim 1, wherein
in each of the plurality of core sheets, the first through-holes and the second through-holes are arranged alternately in a circumferential direction.

3. The rotor as set forth in claim 2, wherein
every predetermined number of the core sheets are arranged at either a first position or a second position rotated from the first position by an angle corresponding to one of the magnet-receiving holes.

4. The rotor as set forth in claim 3, wherein
every one of the core sheets is arranged at either the first position or the second position.

5. The rotor as set forth in claim 1, wherein:
each of the first through-holes is formed in a folded shape to have a curved portion; and
in each of the first through-holes, the connection portion is located at the curved portion of the first through-hole.

6. The rotor as set forth in claim 1, wherein
the connection portion has its width set to be smaller than or equal to a thickness of each of the plurality of core sheets.

7. The rotor as set forth in claim 1, wherein
the connection portion has its side edges formed in a uniformly curved shape such that a width of the connection portion decreases toward a central part in an extending direction of the connection portion.

8. The rotor as set forth in claim 1, wherein
the rotor core has protruding portions each of which is formed, by protruding a corner portion on one side of one of radially outer ends of the magnet-receiving holes, to reduce a width of the radially outer end.

9. The rotor as set forth in claim 1, wherein
the permanent magnets have protruding portions that protrude from axial end faces of the rotor core.

10. The rotor as set forth in claim 1, wherein:
each of the permanent magnets is formed in a folded shape to have a curved portion; and
a thickness of the curved portion is smaller than a thickness of other portions of the permanent magnet.

11. The rotor as set forth in claim 1, wherein
in each of the plurality of core sheets, on a radially outer side of each of the first and second through-holes, there are formed two radially-outer connection portions.

12. A rotating electric machine comprising:
a rotor that comprises
a rotor core including a plurality of core sheets that are laminated together and having a plurality of magnet-receiving holes formed in a folded shape that is convex radially inward, and
a plurality of permanent magnets embedded respectively in the magnet-receiving holes of the rotor core; and
a stator configured to apply a rotating magnetic field to the rotor,
wherein:
each of the plurality of core sheets has a plurality of first through-holes and a plurality of second through-holes, each of the first through-holes having a connection portion formed at an intermediate position in the folded shape of a corresponding one of the magnet-receiving holes to connect inner peripheral edges of the first through-hole that face each other in a width direction of the first through-hole, each of the second through-holes having no connection portion;

the plurality of core sheets are identical in configuration to each other;

the plurality of core sheets are laminated so that each of the magnet-receiving holes of the rotor core is constituted of a mixture of the first and second through-holes of the plurality of core sheets;

each of the plurality of permanent magnets is a bonded magnet;

interior surfaces of the magnet-receiving holes have irregular portions each of which is formed by a difference in position between peripheral edges of the first and second through-holes that overlap in an axial direction; and the permanent magnets have engaging portions located respectively in recesses of the irregular portions.

\* \* \* \* \*